United States Patent
Kitamura et al.

(10) Patent No.: US 11,930,417 B2
(45) Date of Patent: Mar. 12, 2024

(54) TRAVEL SYSTEM AND CONTROL METHOD OF TRAVEL SYSTEM

(71) Applicant: MURATA MACHINERY, LTD., Kyoto (JP)

(72) Inventors: Wataru Kitamura, Inuyama (JP); Tetsuya Kuwahara, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 471 days.

(21) Appl. No.: 17/278,688

(22) PCT Filed: Sep. 3, 2019

(86) PCT No.: PCT/JP2019/034505
§ 371 (c)(1),
(2) Date: Mar. 23, 2021

(87) PCT Pub. No.: WO2020/066486
PCT Pub. Date: Apr. 2, 2020

(65) Prior Publication Data
US 2022/0046509 A1  Feb. 10, 2022

(30) Foreign Application Priority Data

Sep. 27, 2018  (JP) ................. 2018-182354

(51) Int. Cl.
*H04W 36/00* (2009.01)
*G05D 1/00* (2006.01)
(Continued)

(52) U.S. Cl.
CPC .......... *H04W 36/32* (2013.01); *G05D 1/0282* (2013.01); *H04W 4/029* (2018.02);
(Continued)

(58) Field of Classification Search
CPC ....... H04W 36/32; H04W 4/029; H04W 4/44; H04W 36/08; H04W 92/10; H04W 4/021;
(Continued)

(56) References Cited

U.S. PATENT DOCUMENTS 6,484,077 B1 * 11/2002 Unose .............. G05B 19/41895
701/19
7,006,465 B2 * 2/2006 Toshimitsu ............ H01Q 1/246
343/893
(Continued)

FOREIGN PATENT DOCUMENTS

JP    2008-153735 A    7/2008
JP    2014-192577 A   10/2014
(Continued)

OTHER PUBLICATIONS

Hadded et al., "A Centralized TDMA based Scheduling Algorithm for Real-Time Communications in Vehicular Ad Hoc Networks", SoftCOM, Sep. 24, 2016, 6 pages.
(Continued)

*Primary Examiner* — Amancio Gonzalez
(74) *Attorney, Agent, or Firm* — Keating & Bennett, LLP

(57) ABSTRACT

A travel system includes a travelling carriage that travels on a predetermined track, access points including first APs that wirelessly communicate with the travelling carriage and second APs that wirelessly communicate with the travelling carriage in a communication slot different from a communication slot of the first APs, and a controller that, via any one of the access points, receives from the travelling carriage position information indicating the current position of the travelling carriage, and transmits to the traveling carriage a travel instruction to control travel of the travelling carriage. The travelling carriage includes a wireless interface that wirelessly communicates with one of the first APs, and wirelessly communicates with one of the second APs when wireless communication with the one of the first APs is not possible.

29 Claims, 18 Drawing Sheets

(51) Int. Cl.
*H04W 4/029* (2018.01)
*H04W 4/44* (2018.01)
*H04W 36/08* (2009.01)
*H04W 36/32* (2009.01)
*H04W 92/10* (2009.01)

(52) U.S. Cl.
CPC ............. *H04W 4/44* (2018.02); *H04W 36/08* (2013.01); *H04W 92/10* (2013.01)

(58) Field of Classification Search
CPC ... H04W 4/40; H04W 36/0069; H04W 36/38; H04W 4/35; H04W 84/12; H04W 36/0072; G05D 1/0282; G05D 1/02; G05D 1/0285; H04M 11/00
USPC .......................................................... 455/440
See application file for complete search history.

(56) References Cited

U.S. PATENT DOCUMENTS

| | | | | |
|---|---|---|---|---|
| 8,299,914 | B2* | 10/2012 | Culpepper | H04W 4/029 340/539.11 |
| 9,001,821 | B1* | 4/2015 | Shah | H04W 36/0022 455/435.2 |
| 9,280,154 | B2* | 3/2016 | Nagasawa | G05D 1/0027 |
| 9,377,104 | B2* | 6/2016 | Kim | F16H 63/50 |
| 10,091,024 | B2* | 10/2018 | Giroud | B61L 27/20 |
| 10,349,289 | B2* | 7/2019 | Auer | H04W 24/02 |
| 10,820,300 | B2* | 10/2020 | Noh | H04L 5/0032 |
| 10,880,030 | B2* | 12/2020 | Park | H04W 24/08 |
| 11,082,907 | B2* | 8/2021 | Kuwahara | H04B 7/18504 |
| 11,121,016 | B2* | 9/2021 | Kitamura | H01L 21/6773 |
| 11,160,016 | B2* | 10/2021 | Lopes | H04L 61/5007 |
| 2016/0004252 | A1 | 1/2016 | Nagasawa | |
| 2021/0136648 | A1 | 5/2021 | Kuwahara et al. | |

FOREIGN PATENT DOCUMENTS

| | | |
|---|---|---|
| JP | 2016-171497 A | 9/2016 |
| JP | 2018-056623 A | 4/2018 |
| WO | 2018/142781 A1 | 8/2018 |

OTHER PUBLICATIONS

Caixing et al., "Research of the multi-way connectivity probability for platoon-based vehicle-to-infrastructure communication network", The Journal of China Universities of Posts and Telecommunications, Feb. 29, 2016, pp. 1-7.

Official Communication issued in corresponding European Patent Application No. 19864539.2, dated May 31, 2022.

* cited by examiner

TRAVEL SYSTEM AND CONTROL METHOD OF TRAVEL SYSTEM

BACKGROUND OF THE INVENTION

1. Field of the Invention

The present invention relates to a travel system, and a control method of a travel system.

2. Description of the Related Art

Traditionally, there has been a communication device that selectively communicates with any one of a plurality of access points (for example, see Japanese Unexamined Patent Application Publication No. 2014-192577).

Japanese Unexamined Patent Application Publication No. 2014-192577 discloses a mobile terminal that selectively communicates with any one of a plurality of access points. The mobile terminal disclosed in Japanese Unexamined Patent Application Publication No. 2014-192577 detects the electromagnetic wave amplitude during wireless connection, that is, in wireless communication with an access point that has an established communication link. Based on the detected electromagnetic wave amplitude, the mobile terminal predicts the electromagnetic wave amplitude with the access point that has an established communication link at a destination. The mobile terminal disclosed in Japanese Unexamined Patent Application Publication No. 2014-192577 also performs a roaming process based on the predicted electromagnetic wave amplitude.

SUMMARY OF THE INVENTION

There has been a need for redundancy and increased certainty in a system in which a plurality of devices communicate with each other.

Preferred embodiments of the present invention provide travel systems that achieve more improved certainty of communication than before.

A travel system according to an aspect of a preferred embodiment of the present invention includes a travelling carriage to travel on a predetermined track; a plurality of access points including a plurality of first access points to wirelessly communicate with the travelling carriage and a plurality of second access points to wirelessly communicate with the travelling carriage in a communication slot different from a communication slot of the plurality of first access points; and a controller to receive position information from the travelling carriage and transmit a travel instruction to the travelling carriage, via any one of the plurality of access points, the position information indicating a current position of the travelling carriage, and the travel instruction being an instruction to control travel of the travelling carriage, wherein each of the plurality of first access points is disposed so that a portion of a communication area of the first access point overlaps a communication area of an adjacent first access point, each of the plurality of second access points is disposed so that a portion of a communication area of the second access point overlaps a communication area of an adjacent second access point, each of the plurality of first access points is disposed so that at least a portion of the communication area of the first access point overlaps a communication area of any one of the plurality of second access points, and the travelling carriage includes a wireless interface to wirelessly communicate with a first access point among the plurality of first access points, and to wirelessly communicate with a second access point among the plurality of second access points when wireless communication with the first access point is not possible.

Accordingly, the travelling carriage can wirelessly communicate with any one of two access points in a common communication area, for example. As a result, for example, even when one access point has failed, the travelling carriage can wirelessly communicate with the other access point, so that the travelling carriage can communicate with the controller. According to the travel system, therefore, certainty of communication is improved more than before.

Furthermore, for example, the travelling carriage further includes a setting processor to set, to the wireless interface, a communication slot different from a communication slot that is currently set, when wireless communication via the wireless interface is not possible.

Accordingly, the travelling carriage can avoid interruption of communication with controller 400 even when it is provided with one wireless interface, for example. As a result, the certainty of communication for the travel system is further improved.

Furthermore, for example, the travelling carriage further includes an obtaining processor to transmits the position information to the controller and to obtain communication information from the controller, via the wireless interface, the position information indicating the current position of the travelling carriage, and the communication information indicating a communication slot to communicate with the second access point in the current position, and the setting processor is configured or programmed to change the communication slot currently set to the wireless interface to the communication slot indicated in the communication information obtained by the obtaining processor, when wireless communication with the first access point via the wireless interface is not possible.

Accordingly, the setting processor can set a suitable communication slot for a communication slot to be used by the wireless interface based on the position of the travelling carriage. As a result, the certainty of communication for the travel system is further improved.

Furthermore, for example, the travelling carriage further includes a storage to store association information indicating association between the current position of the travelling carriage and a communication slot in which communication with any one of the plurality of access points is possible, and the obtaining processor is configured or programmed to obtain a communication slot in which communication with the second access point is possible in the current position of the travelling carriage based on the association information, when the communication information could not be obtained from the controller before the wireless interface becomes unable to wirelessly communicate with the first access point.

Accordingly, the travelling carriage can continue to communicate with the controller based on the association information. As a result, the certainty of communication for the travel system is further improved.

Furthermore, for example, the wireless interface includes a first wireless interface to wirelessly communicate with the first access point, and a second wireless interface to wirelessly communicate with the second access point.

Accordingly, the travelling carriage can wirelessly communicate with two access points that are in different communication slots simultaneously via the first wireless interface and the second wireless interface. As a result, for example, even when one access point has failed, the travelling carriage can wirelessly communicate with the other access point, so that the travelling carriage can communicate with the controller. According to the travel system, therefore, certainty of communication is improved more than before.

Furthermore, for example, the travelling carriage further includes a setting processor to set, to at least one of the first wireless interface or the second wireless interface, a communication slot different from a communication slot that is currently set, when wireless communication is not possible via at least one of the first wireless interface or the second wireless interface.

Accordingly, the travelling carriage can avoid reduction in the number of available communication slots for wireless communication. As a result, the certainty of communication for the travel system is further improved.

Furthermore, for example, the travelling carriage further includes an obtaining processor to transmit the position information to the controller and obtain communication information from the controller, via at least one of the first wireless interface or the second wireless interface, the position information indicating the current position of the travelling carriage, and the communication information indicating a communication slot to communicate with any one of the plurality of access points in the current position, and the setting processor is configured or programmed to change the communication slot currently set to the first wireless interface to the communication slot indicated in the communication information obtained by the obtaining processor, when wireless communication via at least the first wireless interface is not possible.

Accordingly, the setting processor can set a suitable communication slot for a communication slot to be used by the first wireless interface based on the position of the travelling carriage. As a result, the certainty of communication for the travel system is further improved.

Furthermore, for example, the obtaining processor is configured or programmed to transmit the position information to the controller and obtain the communication information from the controller, via the second wireless interface, when wireless communication via the first wireless interface is not possible.

Accordingly, it is ensured that the travelling carriage can obtain the communication information. As a result, the certainty of communication for the travel system is further improved.

Furthermore, for example, the obtaining processor is configured or programmed to transmit the position information to the controller and obtain the communication information from the controller, via at least one of the first wireless interface or the second wireless interface, before the first wireless interface and the second wireless interface become unable to wirelessly communicate, and the setting processor changes the communication slot currently set to the first wireless interface to the communication slot indicated in the communication information, after the first wireless interface and the second wireless interface become unable to wirelessly communicate.

Accordingly, it is further ensured that the travelling carriage can obtain the communication information. As a result, the certainty of communication for the travel system is further improved.

Furthermore, for example, the travelling carriage further includes a storage to store association information indicating association between the current position of the travelling carriage and a communication slot in which communication with any one of the plurality of access points is possible, and the obtaining processor is configured or programmed to obtain a communication slot in which communication with any one of the plurality of access points is possible in the current position of the travelling carriage based on the association information, when communication information could not be obtained from the controller before the first wireless interface and the second wireless interface become unable to wirelessly communicate.

Accordingly, even when it is not possible to wirelessly communicate with both the first access point and the second access point, for example, it is ensured that the travelling carriage can obtain the respective communication slots set to the first wireless interface and the second wireless interface for communication with the first access point and the second access point. As a result, the certainty of communication for the travel system is further improved.

Furthermore, for example, the obtaining processor is configured or programmed to obtain, from the controller, a communication slot which is set to the first access point and in which communication is possible in the current position and a communication slot which is set to the second access point and in which communication is possible in the current position, as the communication information, and the setting processor is configured or programmed to change the communication slot set to each of the first wireless interface and the second interface, based on the communication information obtained by the obtaining processor.

Accordingly, even when it is not possible to wirelessly communicate with both the first access point and the second access point, for example, the setting processor can set a suitable communication slot for each of communication slots to be used by the first wireless interface and the second wireless interface, respectively, based on the communication information. As a result, the certainty of communication for the travel system is further improved.

Furthermore, for example, the setting processor is configured or programmed to change the communication slot set to the first wireless interface to the communication slot set to the second wireless interface, when wireless communication via the first wireless interface is not possible.

Accordingly, the communication slot used by the second wireless interface can also be used for communication by the first wireless interface. Accordingly, even when the second wireless interface has failed, for example, the travelling carriage can continue communication by using the first wireless interface. As a result, the certainty of communication for the travel system is further improved.

Furthermore, for example, the setting processor is configured or programmed to perform setting to enable the second interface to communicate in the communication slot currently set in the second wireless interface and the communication slot currently set in the first wireless interface, when wireless communication via the first wireless interface is not possible.

Accordingly, the second wireless interface is available for communication with both the first access point and the second access point. As a result, the certainty of communication for the travel system is further improved.

Furthermore, for example, the setting processor is configured or programmed to change the communication slot currently set in the second wireless interface to the communication slot currently set in the first wireless interface, when wireless communication between the first wireless interface and the first access point is not possible and wireless communication between the second wireless interface and the second access point is not possible.

Accordingly, even when the first wireless interface and the second access point have failed, for example, the travelling carriage can continue to wirelessly communicate with the controller by the second wireless interface and the first access point. As a result, the certainty of communication for the travel system is further improved.

Furthermore, for example, each of the plurality of first access points is disposed so that at least a portion of the communication area of the first access point overlaps the communication area of any one of the plurality of second access points, and another portion of the communication area of the first access point does not overlap the communication area of any one of the plurality of second access points, and each of the plurality of second access points is disposed so that at least a portion of the communication area of the second access point overlaps the communication area of any one of the plurality of first access points, and another portion of the communication area of the second access point does not overlap the communication area of any one of the plurality of first access points.

Accordingly, while continuing to wirelessly communicate with at least one of the first access point and the second access point, the travelling carriage can change the wireless communication counterpart among a plurality of first access points and can change the wireless communication counterpart among a plurality of second access points. As a result, the certainty of communication for the travel system is further improved.

Furthermore, a control method of a travel system according to an aspect of a preferred embodiment of the present invention is a control method of a travel system in which each of a plurality of first access points is disposed so that a portion of a communication area of the first access point overlaps a communication area of an adjacent first access point, each of a plurality of second access points is disposed so that a portion of a communication area of the second access point overlaps a communication area of an adjacent second access point, each of the plurality of first access points is disposed so that at least a portion of the communication area of the first access point overlaps a communication area of any one of the plurality of second access points, the travel system including a travelling carriage including a wireless interface to wirelessly communicate with at least one of a first access point or a second access point, the control method of a travel system including: (a) causing a plurality of access points to wirelessly communicate with the travelling carriage, the plurality of access points including the plurality of first access points to wirelessly communicate with the travelling carriage and a plurality of second access points to wirelessly communicate with the travelling carriage in a communication slot different from a communication slot of the plurality of first access points; (b) receiving position information from the travelling carriage and transmitting a travel instruction to the travelling carriage, via any one of the plurality of access points, by a controller, the position information indicating a current position of the travelling carriage, and the travel instruction being an instruction to control travel of the travelling carriage; and (c) causing the travelling carriage to travel on a predetermined track, wherein the step (c) includes, by the travelling carriage, wirelessly communicating with the first access point via the wireless interface, and wirelessly communicating with the second access point via the wireless interface when wireless communication with the first access point is not possible.

Accordingly, the travelling carriage can wirelessly communicate with any one of two access points in a common communication area, for example. As a result, for example, even when one access point has failed, the travelling carriage can wirelessly communicate with the other access point, so that the travelling carriage can communicate with the controller. According to the control method of the travel system, therefore, certainty of communication is improved more than before.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Travel systems according to preferred embodiments of the present invention achieve greater certainty of communication than before.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the Drawings.

Note that each of the following preferred embodiments is a preferred specific example of the present invention. The numerical values, shapes, materials, structural components, the arrangement and connection of the structural components, steps, the processing order of the steps, etc., shown in the following preferred embodiments are mere examples, and thus are not intended to limit the present invention. Furthermore, among the structural components described in the following preferred embodiments, structural components not recited in any one of the independent claims that indicate the broadest concepts of the present invention are described as optional structural components. Note that same components are given the same reference signs, and their description may be omitted.

Preferred Embodiment 1

A travel system according to Preferred Embodiment 1 will now be described.

The travelling carriage described below is implemented as a travelling carriage that communicates with a controller by wireless communication in which a plurality of access points (AP) disposed to cover a facility are sequentially used, for example.

Figure 1:
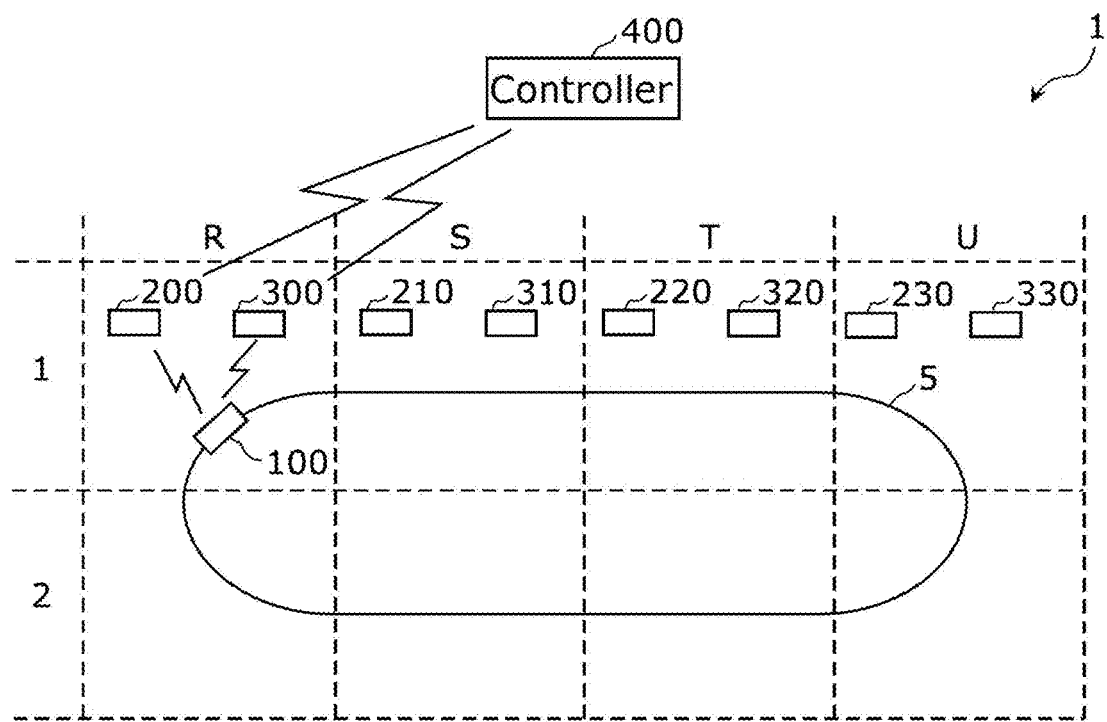
FIG. 1 is a schematic view illustrating a network configuration of a travel system including a travelling carriage according to Preferred Embodiment 1 of the present invention.

FIG. 1 is a schematic view illustrating a network configuration of travel system 1 including travelling carriage 100 according to Preferred Embodiment 1. FIG. 1 illustrates both a top view of a facility in which travel system 1 is deployed and a network configuration diagram.

Travel system 1 is a guided travel system that allows travelling carriage 100 to travel under computer control by controller 400 on track 5, which is a travelling path provided on the ceiling or floor of the facility. Travelling carriage 100 moves to an instructed spot or transports an article according to control by controller 400.

Although travel system 1 will be described taking the case of being a guided travel system as an example, the description below may also be applicable to a guideless travel system. Further, although FIG. 1 illustrates only one travelling carriage 100, travel system 1 may include a plurality of travelling carriages 100.

As illustrated in FIG. 1, travel system 1 includes travelling carriage 100, a plurality of first access points (first AP) 200, 210, 220, and 230, a plurality of second access points (second AP) 300, 310, 320, and 330, and controller 400.

Travelling carriage 100 is an unmanned travelling vehicle that travels on a predetermined track 5 without a person on board and travels under control of controller 400.

Travelling carriage 100 freely travels on track 5 under control of controller 400 to transport an article and the like. Travelling carriage 100 also includes first wireless interface (first IF) 110 (see FIG. 3) and second wireless interface (second IF) 120 (see FIG. 3), establishes a wireless communication link (hereinafter also referred to simply as a communication link) with a plurality of access points, and communicates with controller 400 through wireless communication by using the communication link.

Travelling carriage 100 performs changeover of access points to be a partner with which travelling carriage 100 is to establish the communication link (i.e., roaming).

In travel system 1, areas where travelling carriage 100 can travel, specifically, locations on track 5 are segmented into a plurality of blocks. Depending on which block it belongs, travelling carriage 100 establishes a communication link with suitable first AP (for example, any one of first AP 200, 210, 220, and 230) and second AP (for example, any one of second AP 300, 310, 320, and 330). In other words, travelling carriage 100 autonomously selects an AP with which travelling carriage 100 is to establish a communication link depending on its own position. For example, travelling carriage 100 wirelessly communicates with first AP 200, and wirelessly communicates with second AP 300 when it is unable to wirelessly communicate with first AP 200.

For example, in FIG. 1, travelling carriage 100 has communication links established with first AP 200 and second AP 300. The locations on track 5 are segmented into a plurality of blocks, and the block is used to identify the position of travelling carriage 100. Note that the blocks are illustrated by dashed lines in FIG. 1; blocks on the upper row of the page are denoted as blocks R1, S1, T1, and U1 from left to right, and blocks on the lower row of the page are denoted as blocks R2, S2, T2, and U2 from left to right. Although each of the blocks in FIG. 1 is segmented in a rectangular shape, it is not a limitation and the block may be segmented in any shape. Although first APs and second APs are also disposed in blocks R2, S2, T2, and U2 in a similar manner to blocks R1, S1, T1, and U1, they are not illustrated in FIG. 1. Further, although in FIG. 1, communication areas of adjacent blocks such as block R1 and block S1, for example, are simply illustrated as being separated from each other, communication areas of adjacent blocks may be partially overlapped to prevent communication with a plurality of APs from being discontinued when travelling carriage 100 moves between the blocks.

First APs 200, 210, 220, and 230 (hereinafter also referred to as first AP 200 and so on) are access points that establish communication links with travelling carriage 100 for wireless communication.

Second APs 300, 310, 320, and 330 (hereinafter also referred to as second AP 300 and so on) are access points that establish communication links with travelling carriage 100 for wireless communication. Further, first AP 200 and so on and second AP 300 and so on use wireless communication slots that are different from each other to communicate with travelling carriage 100.

In this way, a plurality of APs (first AP 200 and second AP 300 and so on) included in travel system 1 include a plurality of first APs 200 and so on that wirelessly communicate with travelling carriage 100, and a plurality of second APs 300 and so on that wirelessly communicate with travelling carriage 100 in communication slots that are different from those of first APs.

A communication slot indicates, for example, at least one of a channel (in other words, frequency slot) and a time slot is included. For example, "communication slots that are different" indicates that not only channels, that is, frequencies used for communication are different, but also timings for communication are different even though the frequency is the same, that is, time slots are different. For example, this applies to the case in which in a first timing when first AP 200 wirelessly communicates with travelling carriage 100 in channel 1, first AP 210 wirelessly communicates with travelling carriage 100 in channel 1 in a second timing different from the first timing. In the description below, description will be made as an example as to the case in which first AP 200 and so on and second AP 300 and so on use different channels from each other.

Figure 2:
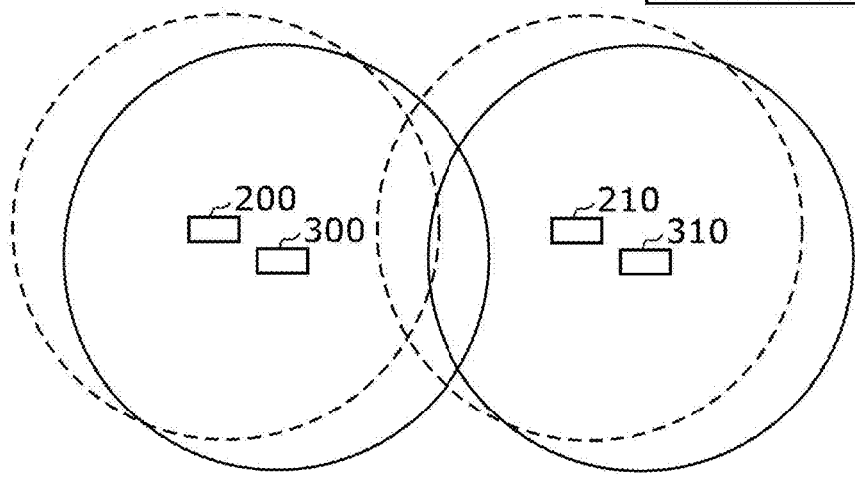
FIG. 2 is a diagram for illustrating communication areas of the first access point and the second access point according to Preferred Embodiment 1 of the present invention.

FIG. 2 is a diagram for illustrating communication areas of first AP 200 and so on and second AP 300 and so on according to Preferred Embodiment 1. In FIG. 2, a communication area for each of first APs 200 and 210, and second APs 300 and 310 is schematically illustrated as an example. Circles of solid lines illustrated in FIG. 2 schematically illustrate communication areas of first APs 200 and 210, and circles of dashed lines illustrated in FIG. 2 schematically illustrate communication areas of second APs 300 and 310.

First AP 200 and so on and second AP 300 and so on perform wireless communication by using a communication interface such as a wireless LAN (Local Area Network) compliant with standards such as the IEEE802.11a, b, g, n standards, for example. Each of first AP 200 and so on and second AP 300 and so on is disposed at a position where track 5 is covered by a wireless communication area.

Each of a plurality of first APs 200 and so on includes a communication area that partially overlaps that of adjacent first AP (for example, first AP 200 and first AP 210). Each of a plurality of second APs 300 and so on includes a communication area that partially overlaps that of adjacent second AP (for example, second AP 300 and second AP 310). Further, each of a plurality of first APs 200 and so on includes a communication area that at least partially overlaps that of any one of a plurality of second APs 300 and so on.

As illustrated in FIG. 2, for example, the communication areas of first AP and second AP may be offset instead of being completely overlapped. In other words, each of a plurality of first APs 200 and so on may include a communication area that is overlapped in at least one portion and is not overlapped in the remaining portion with that of any one of a plurality of second APs 300 and so on. Each of a plurality of second APs 300 and so on may also include a communication area that is overlapped in at least one portion and is not overlapped in the remaining portion with that of any one of a plurality of first APs 200 and so on.

According to such a configuration, while continuing to wirelessly communicate with at least one of first AP 200 and so on and second AP 300 and so on, travelling carriage 100 can change the wireless communication counterpart among a plurality of first APs 200 and so on and can change the wireless communication counterpart among a plurality of second APs 300 and so on. As a result, the certainty of communication for travel system 1 is further improved.

It is assumed that communication slots used by first AP 200 and so on and second AP 300 and so on for wireless communication is predetermined. For example, first AP 200 and so on uses a 2.4 GHz band channel (for example, channel 1, 6, and 11) and second AP 300 and so on uses a 5.2 GHz band channel (for example, channel 36, 40, 44, and 48). These are examples only, and first AP 200 and so on may use a 5.2 GHz band channel (for example, channel 36, 40, 44, and 48) and second AP 300 and so on may uses a 5.3 GHz band channel (for example, channel 52, 56, 60, and 64).

The first AP 200 and the second AP 300 preferably use a channel of a different frequency band.

Adjacent first APs use mutually different communication slots for wireless communication. Adjacent second APs use mutually different communication slots for wireless communication. For example, when first AP 200 uses 2.4 GHz band channel 1 as the communication slot, first AP 210 uses 2.4 GHz band channel 6 as the communication slot. In this case, first AP 220 only needs to use other channels than 2.4 GHz band channel 6 as the communication slot; it may use 2.4 GHz band channel 1 as the communication slot and may use 2.4 GHz band channel 11 as the communication slot. As a matter of course, when first AP 200 uses 2.4 GHz band channel 1 as the communication slot in the first timing, first AP 210 may use 2.4 GHz band channel 1 and use a time slot that uses the second timing, which is different from the first timing used by first AP 200 for communication, as the communication slot. The allocation of communication slots used by adjacent second APs is similar to that of communication slots used by adjacent first APs. Note that the adjacent APs refers to APs that have an at least partially overlapped communication area, for example.

Referring back to FIG. 1, controller 400 is a control device that controls operation of travelling carriage 100 by a computer. Specifically, controller 400 transmits a travel instruction to travelling carriage 100, the travel instruction being a control signal including a travel command that causes travelling carriage 100 to travel to a predetermined position, a transport command that causes travelling carriage 100 to transport an article, and the like. More specifically, controller 400 receives position information indicating the current position of travelling carriage 100 from travelling carriage 100 via any one of a plurality of APs, and transmits the travel instruction to travelling carriage 100 to control travel of travelling carriage 100. In other words, controller 400 receives the position information indicating the current position of travelling carriage 100 from travelling carriage 100 via any one of a plurality of AP. Controller 400 also transmits the travel instruction to travelling carriage 100 to control travel of travelling carriage 100 via any one of a plurality of APs.

Next, a specific configuration of travel system 1 will be described.

Figure 3:
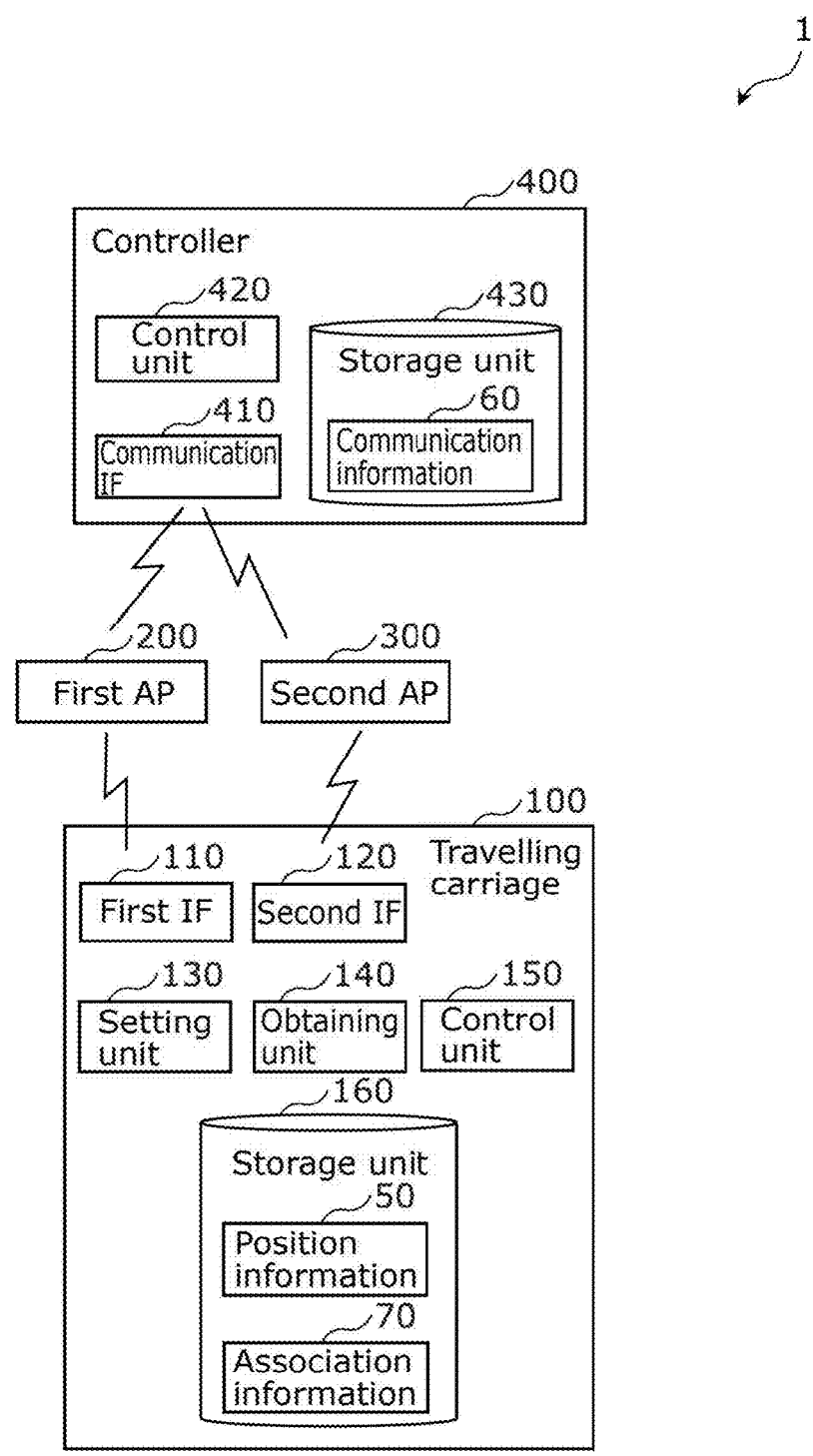
FIG. 3 is a block diagram illustrating a functional configuration of the travel system according to Preferred Embodiment 1 of the present invention.

FIG. 3 is a block diagram illustrating a functional configuration of travel system 1 according to Preferred Embodiment 1.

Travelling carriage 100 includes first IF 110, second IF 120, setting unit 130, obtaining unit 140, control unit 150, and storage unit 160.

Each of first IF 110 and second IF 120 is a communication interface such as a wireless LAN compliant with standards such as the IEEE802.11a, b, g, n standards, for example. Each of first IF 110 and second IF 120 performs transmission/reception of data, establishes and disconnects a communication link, and the like under control of control unit 150.

First IF 110 is a communication interface that wirelessly communicates with first AP 200 and so on. For example, first IF 110 wirelessly communicates with first AP 200 and so on in a communication band of 2.4 GHz band.

Second IF 120 is a communication interface that wirelessly communicates with second AP 300 and so on. For example, second IF 120 wirelessly communicates with second AP 300 and so on in a communication band of 5 GHz band.

In this way, travelling carriage 100 according to Preferred Embodiment 1 includes two wireless interfaces. As described in Example 2 below, travelling carriage 100 can wirelessly communicate with second AP 300 and so on via first IF 110 when, for example, it is unable to wirelessly communicate with first AP 200 and so on via first IF 110. Travelling carriage 100 can also wirelessly communicate with first AP 200 via second IF 120 when, for example, it is similarly unable to wirelessly communicate with second AP 300 and so on via second IF 120.

Each of first IF 110 and second IF 120 performs wireless communication by using a communication slot set by setting unit 130. For example, when 2.4 GHz band channel 1 is set by setting unit 130 as a communication slot for wireless communication used by first IF 110, and 5 GHz band channel 36 is set by setting unit 130 as a communication slot for wireless communication used by second IF 120, first IF 110 is to be connected with first AP 200 in 2.4 GHz band channel 1 and second IF 120 is to be connected with second AP 300 in 5 GHz band channel 36. In the present preferred embodiment, description is made on the premise that travelling carriage 100 is predetermined to wirelessly communicate with first AP 200 and so on by first IF 110 and wirelessly communicate with second AP 300 and so on by second IF 120. However, which of first AP 200 and so on and second AP 300 and so on first IF 110 and second IF 120 is to be connected with is a matter of choice.

Setting unit 130 is a processing unit that sets a communication slot different from a currently set communication slot to at least one of first IF 110 and second IF 120 when it is not possible to perform wireless communication via at least one of first IF 110 and second IF 120. When wireless communication using first IF 110 with first AP 200 is interrupted, for example, setting unit 130 changes the communication slot used for first IF 110 from channel 1 to channel 6. For example, when wireless communication using first IF 110 with first AP 200 is interrupted, for example, setting unit 130 changes the channel for first IF 110 from the 2.4 GHz band channel to the 5 GHz band channel, which is of a frequency band of the channel used for second IF 120.

Setting unit 130 is implemented by, for example, a microcontroller or the like. Specifically, setting unit 130 is implemented by a non-volatile memory that stores a program, a volatile memory that serves as a temporary storage area to execute the program, input/output ports, a processor that executes the program, and the like. Setting unit 130 may be implemented by special purpose electronics or circuitry that performs operations.

Obtaining unit 140 transmits position information 50 indicating the current position of travelling carriage 100 to controller 400 via at least one of first IF 110 and second IF 120, and obtains communication information 60 indicating a communication slot for communication with any one of a plurality of APs at the current position of travelling carriage 100 from controller 400. Obtaining unit 140 is a processing unit that controls one of first IF 110 and second IF 120 to transmit position information 50 and receive communication information 60, for example.

Obtaining unit 140 is implemented by, for example, a microcontroller or the like. Specifically, obtaining unit 140 is implemented by a non-volatile memory that stores a program, a volatile memory that serves as a temporary storage area to execute the program, input/output ports, a processor that executes the program, and the like. Obtaining unit 140 may be implemented by special purpose electronics or circuitry that performs operations.

Alternatively, setting unit 130 and obtaining unit 140 may be implemented by one CPU or may be implemented by different CPUs, for example.

Setting unit 130 changes the communication slot currently set to first IF 110 to a communication slot indicated in communication information 60 obtained by obtaining unit 140 when it is not possible to perform wireless communication via at least first IF 110.

Position information 50 is information uniquely indicating the position of a block. Position information 50 includes, for example, information that associates blocks such as R1 and S1 set on track 5 with the position or the like of travelling carriage 100 on track 5 included in the block. Position information 50 may be considered as information that associates a position or the like set on track 5 with a block to which the position belongs.

Position information 50 is not limited to the form described above. In a trackless travel system, for example, position information 50 may be based on a position in a facility as a reference instead of using a track as a reference.

Figure 4:
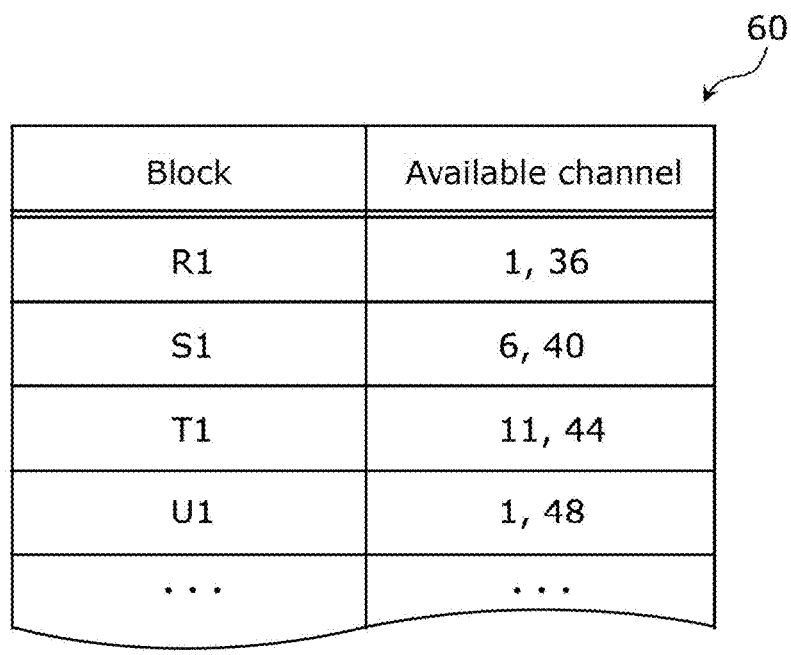
FIG. 4 is an explanatory diagram illustrating communication information according to Preferred Embodiment 1 of the present invention.

FIG. 4 is an explanatory diagram illustrating communication information 60 according to Preferred Embodiment 1.

Communication information 60 is information including each block indicated in position information 50 and a communication slot available within the block that are associated with each other.

Each entry (each row) of communication information 60 illustrated in FIG. 4 includes a block and a communication slot available within the block. For example, the entries in the topmost row of communication information 60 show that 2.4 GHz band channel 1 and 5 GHz band channel 36 are available within block R1. Similarly, the entries in the second from the top of communication information 60 show that 2.4 GHz band channel 6 and 5 GHz band channel 40 are available within block S1.

Travelling carriage 100 includes a sensor that senses electromagnetic wave or light to determine its own current position, for example. Obtaining unit 140 obtains the current position of travelling carriage 100 by, for example, light received from a plurality of optical transmitters disposed along track 5, and transmits obtained position information 50 indicating the current position to controller 400.

Although FIG. 4 illustrates an example of position information 50 being stored in storage unit 160, obtaining unit 140 may alternatively transmit position information 50 indicating the obtained current position of the host carriage to controller 400 without storing it in storage unit 160.

The way of obtaining the current position is not limited to by use of the optical transmitter/receiver. For example, the way of obtaining the current position may be by optically reading and converting marking information such as a barcode attached to the vicinity of track 5, or may be by IMES (Indoor MEssaging System) (so called indoor GPS (Global Positioning System). Alternatively, the way of obtaining the current position may be based on information from a travel control unit that manages feedback information (motor rotational frequency) from a drive motor mounted on a travel wheel or information from a sensor such as an acceleration sensor or a direction sensor provided on travelling carriage 100, or may be a combination of the ways of obtaining described above.

Referring back to FIG. 3, control unit 150 is a processing unit that controls travel of travelling carriage 100 or the like. Control unit 150 controls, for example, first IF 110 and second IF 120 to receive a travel instruction such as a travel command from controller 400, and controls travel of travelling carriage 100 based on received travel instruction.

Control unit 150 is implemented by, for example, a microcontroller or the like. Specifically, control unit 150 is implemented by a non-volatile memory that stores a program, a volatile memory that serves as a temporary storage area to execute the program, input/output ports, a processor that executes the program, and the like. Control unit 150 may be implemented by special purpose electronics or circuitry that performs operations.

Control unit 150 may be implemented by one CPU along with setting unit 130 and obtaining unit 140 or may be implemented by a different CPU from the other units.

Storage unit 160 is a storage such as an HDD (Hard Disk Drive), SSD (Solid State Drive), and an eMMC (embedded Multi Media Card) that stores data received from controller 400. Storage unit 160 has stored therein a control program executed by each of setting unit 130, obtaining unit 140, and control unit 150, for example.

For example, storage unit 160 has stored therein association information 70 indicating association between the current position of travelling carriage 100 and a communication slot in which travelling carriage 100 can communicate with any one of a plurality of APs at the current position. As described above, when obtaining unit 140 can obtain communication information 60 from controller 400 by using at least one of first IF 110 and second IF 120, then setting unit 130 can change the communication slot of at least one of first IF 110 and second IF 120 based on communication information 60 obtained by obtaining unit 140. Here, there may be a case in which travelling carriage 100 becomes unable to communicate with both first AP 200 and second AP 300 due to failure of first AP 200 and second IF 120, for example. In this case, when communication information 60 cannot be obtained from controller 400 before first IF 110 and second IF 120 lose wireless communication, obtaining unit 140 obtains a communication slot in which travelling carriage 100 can communicate with any one of a plurality of APs at the current position of travelling carriage 100 based on association information 70.

A specific control method of travel system 1 will be described later.

Controller 400 includes communication interface (communication IF) 410, control unit 420, and storage unit 430.

Communication IF 410 is a communication interface that communicates with first AP 200 and so on and second AP 300 and so on.

Control unit 420 is a processing unit that controls communication IF 410 and the like to transmit a travel instruction, which is a control signal of communication information 60, a travel command to control travel of travelling carriage 100, or the like, to travelling carriage 100, and to receive position information 50 indicating the current position of travelling carriage 100 from travelling carriage 100 and to store position information 50 in storage unit 430.

Control unit 420 is implemented by, for example, a microcontroller or the like. Specifically, control unit 420 is implemented by a non-volatile memory that stores a program, a volatile memory that serves as a temporary storage area to execute the program, input/output ports, a processor that executes the program, and the like. Control unit 420 may be implemented by special purpose electronics or circuitry that performs operations.

Storage unit 430 is a storage such as HDD and SSD that stores information such as communication information 60. Storage unit 160 has stored therein a control program executed by control unit 420, for example.

Next, with reference to FIG. 3 and FIGS. 5 to 14, travelling procedure of travelling carriage 100 according to Preferred Embodiment 1 will be described. Note that in FIG. 5, FIG. 7, FIG. 9, FIG. 11, and FIG. 13, part of components of travel system 1 such as components of travelling carriage 100 and controller 400 is not illustrated. Further, FIG. 5, FIG. 7, FIG. 9, FIG. 11, and FIG. 13 illustrate the case in which first IF 110 is already in wireless communication with first AP 200 and second IF 120 is already in wireless communication with second AP 300.

Example 1

Figure 5:
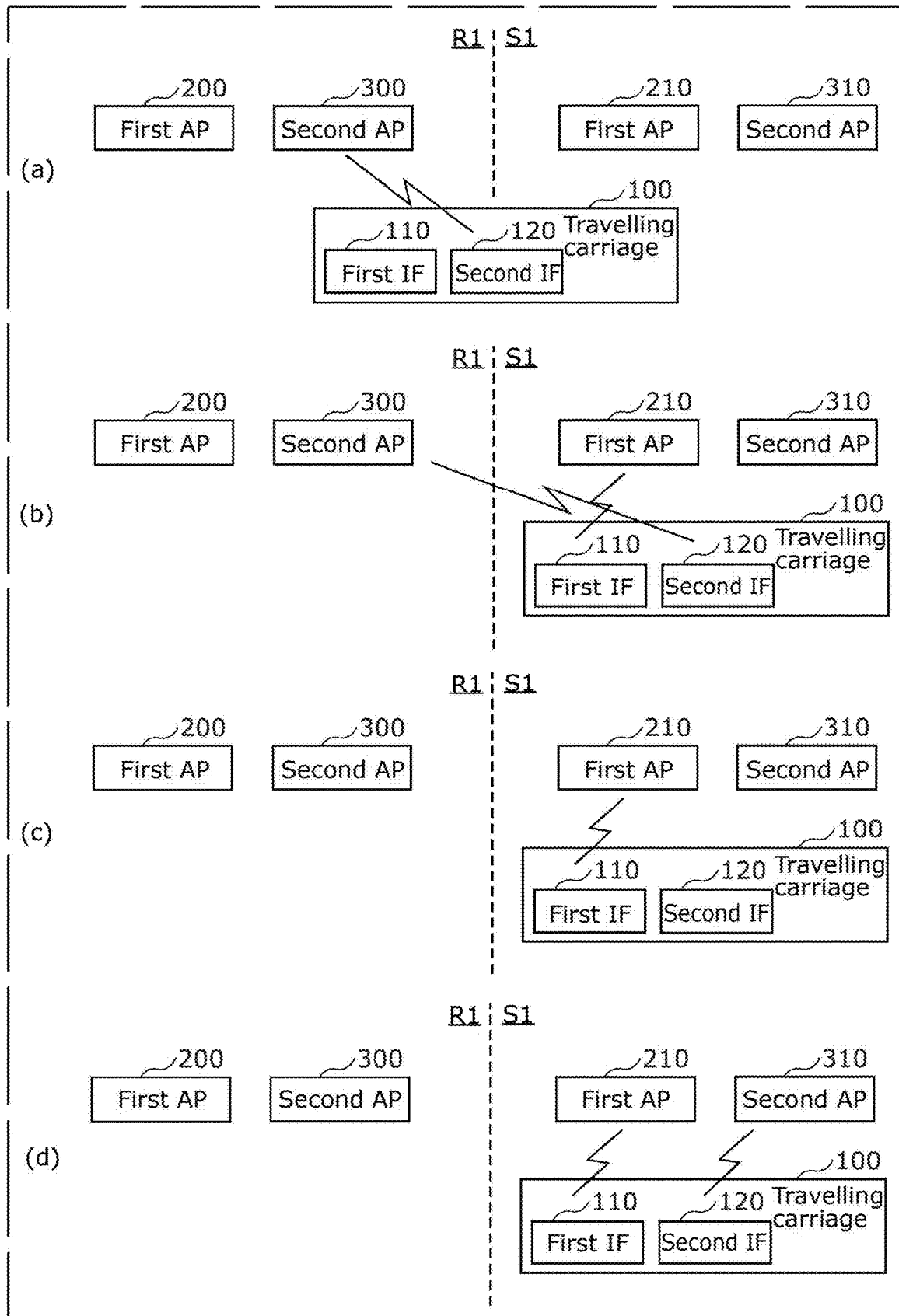
FIG. 5 is an explanatory diagram illustrating Example 1 of a control method of the travel system according to Preferred Embodiment 1 of the present invention.
Figure 6:
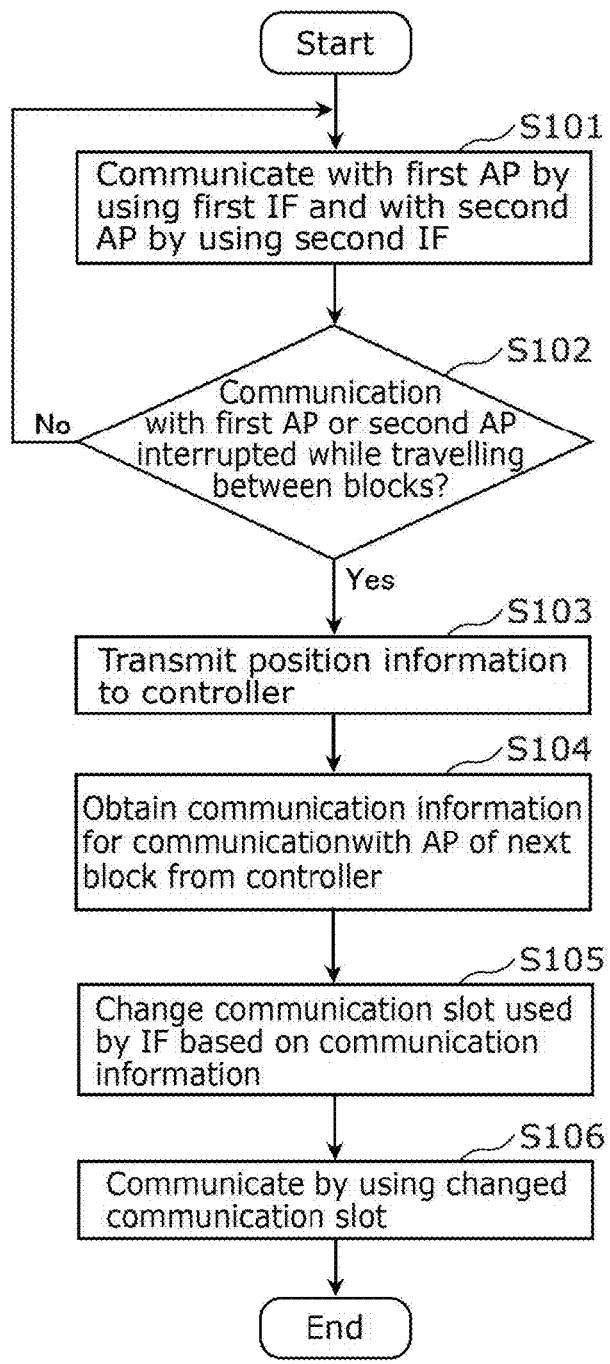
FIG. 6 is a flow chart illustrating Example 1 of a processing procedure of the travel system according to Preferred Embodiment 1 of the present invention.

FIG. 5 is an explanatory diagram illustrating Example 1 of a control method of travel system 1 according to Preferred Embodiment 1. FIG. 6 is a flow chart illustrating Example 1 of a processing procedure of travel system 1 according to Preferred Embodiment 1.

First, it is assumed that travelling carriage 100 is in communication with first AP 200 by using first IF 110 and with second AP 300 by using second IF 120 (step S101). By making a communication in this way, control unit 150 receives a travel instruction such as a travel command from controller 400 via first IF 110 or second IF 120, and performs control (for example, travel control of travelling carriage 100) based on the received travel instruction.

Next, travelling carriage 100 determines whether communication with first AP 200 or second AP 300 is interrupted while it is travelling between the blocks, that is, whether wireless communication is not possible (step S102). For example, in step S102, it is assumed that travelling carriage 100 travels from block R1 to block S1 as illustrated in a view (a) of FIG. 5.

When it is determined that communication with first AP 200 or second AP 300 is not interrupted while travelling carriage 100 is travelling between the blocks (No in step S102), travelling carriage 100 (for example, control unit 150) returns the process to step S101.

On the other hand, when it is determined that communication with first AP 200 or second AP 300 is interrupted while travelling carriage 100 is travelling between the blocks (Yes in step S102), travelling carriage 100 transmits position information 50 to controller 400 (step S103). Specifically, in step S103, obtaining unit 140 transmits position information 50 indicating the current position of travelling carriage 100 obtained in the manner as described above to controller 400 via first IF 110 or second IF 120. More specifically, in step S103, obtaining unit 140 transmits position information 50 indicating the current position of travelling carriage 100 obtained in the manner as described above to controller 400 via first IF 110 or second IF 120, whichever is capable of communication. Alternatively, obtaining unit 140 may transmit position information 50 to controller 400 via any of first IF 110 and second IF 120 when both the IFs are capable of communication.

Next, obtaining unit 140 obtains communication information 60 for communication with an AP (here, for example, first AP 210) of the next block (here, block S1) from controller 400 (step S104).

Next, based on communication information 60 obtained by obtaining unit 140, setting unit 130 changes the communication slot used by at least one of first IF 110 and second IF 120, specifically, an IF that is unable to communicate with the AP, that is, an IF in which communication with the AP is discontinued (here, for example, first IF 110) to a communication slot indicated in communication information 60 (step S105). For example, in step S105, setting unit 130 changes the channel used by first IF 110 from 2.4 GHz band channel 1 in which first IF 110 can communicate with first AP 200 to 2.4 GHz band channel 6 in which it can communicate with first AP 210.

Next, for example, as illustrated in a view (b) of FIG. 5 and FIG. 6, control unit 150 communicates with controller 400 via first IF 110 and first AP 210 by using the communication slot changed by setting unit 130 (step S106).

Performing processes similar to those in step S104 and step S105, setting unit 130 changes, based on communication information 60, the communication slot set to second IF 120 to a communication slot indicated in communication information 60 to allow second IF 120 and second AP 310 to communicate with each other as illustrated in a view (c) of FIG. 5 and a view (d) of FIG. 5.

As described above, travel system 1 according to Preferred Embodiment 1 includes: travelling carriage 100 that travels on a predetermined track 5; a plurality of APs that include a plurality of first APs 200 and so on that wirelessly communicate with travelling carriage 100 and a plurality of second APs 300 and so on that wirelessly communicate with travelling carriage 100 in a communication slot different from that of first AP 200 and so on; and controller 400 that receives position information 50 indicating the current position of travelling carriage 100 from travelling carriage 100 via any one of a plurality of APs and transmits a travel instruction to control travel of travelling carriage 100 to travelling carriage 100. A plurality of first APs 200 and so on each include a communication area that partially overlaps that of adjacent first AP. A plurality of second APs 300 and so on each include a communication area that partially overlaps that of adjacent second AP. Each of a plurality of first APs 200 and so on include a communication area that at least partially overlaps that of each of a plurality of second APs 300 and so on. Further, travelling carriage 100 includes an IF that wirelessly communicates with first AP 200 and so on and wirelessly communicates with second AP 300 and so on when it is unable to wirelessly communicate with first AP 200 and so on. Travelling carriage 100 according to Preferred Embodiment 1 includes first IF 110 that wirelessly communicates with first AP 200 and so on and second IF 120 that wirelessly communicates with second AP 300 and so on as wireless interfaces.

A control method of travel system 1 according to Preferred Embodiment 1 is a control method of travel system 1 in which a plurality of first APs 200 and so on each include a communication area that partially overlaps that of adjacent first AP, a plurality of second APs 300 and so on each include a communication area that partially overlaps that of adjacent second AP, and each of a plurality of first APs 200 and so on include a communication area that at least partially overlaps that of any one of a plurality of second APs 300 and so on, travel system 1 including travelling carriage 100 that includes a wireless interface that wirelessly communicates with at least one of first AP 200 and so on and second AP 300 and so on. The control method of travel system 1 includes a communication step of causing a plurality of APs to wirelessly communicate with travelling carriage 100, the plurality of APs including a plurality of first APs 200 and so on that wirelessly communicate with travelling carriage 100 and a plurality of second APs 300 and so on that wirelessly communicate with travelling carriage 100 in a communication slot different from that of first AP 200 and so on; a controlling step of receiving position information 50 indicating the current position of travelling carriage 100 from travelling carriage 100 via any one of the plurality of APs and transmitting by controller 400 a travel instruction to control travel of travelling carriage 100 to travelling carriage 100; and a travelling step of causing travelling carriage 100 to travel on a predetermined track 5 based on the travel instruction.

Accordingly, travelling carriage 100 can wirelessly communicate with two APs (first AP 200 and so on and second AP 300 and so on) that are in different communication slots simultaneously via first IF 110 and second IF 120. As a result, for example, even when one AP has failed, travelling carriage 100 can wirelessly communicate with the other AP to continue to communicate with controller 400. In this way, according to travel system 1, certainty of communication is improved more than before. With two or more IFs, travelling carriage 100 can use two or more different communication standards together to perform wireless communication. Typically, when communication standards are different, there may or may not be an effect of external noises or the magnitude of the effect may be different. As a result, even when communication based on one communication standard is lost due to an effect of external noises or the like, communication based on the other communication standard is likely to be possible, and thus the certainty of communication for travel system 1 can be further improved.

When wireless communication via at least one of first IF 110 and second IF 120 is lost, for example, setting unit 130 sets a communication slot different from the currently set communication slot to the at least one of first IF 110 and second IF 120.

For example, the control method of travel system 1 according to Preferred Embodiment 1 further includes a setting step of setting a communication slot different from the currently set communication slot to at least one of first IF 110 and second IF 120 when travelling carriage 100 is incapable of wireless communication via at least one of first IF 110 and second IF 120.

Accordingly, travelling carriage 100 can avoid reduction in the number of communication slots available for travelling carriage 100 for wireless communication by setting unit 130. As a result, the certainty of communication for travel system 1 is further improved.

For example, obtaining unit 140 transmits position information 50 indicating the current position of travelling carriage 100 to controller 400 via at least one of first IF 110 and second IF 120, and obtains communication information 60 indicating a communication slot for communication with any one of a plurality of APs at the current position of travelling carriage 100 from controller 400. In this case, for example, setting unit 130 changes the communication slot currently set to first IF 110 to a communication slot indicated in communication information 60 obtained by obtaining unit 140, when it is not possible to perform wireless communication via at least first IF 110.

For example, the control method of travel system 1 according to Preferred Embodiment 1 further includes an obtaining step of travelling carriage 100 transmitting position information 50 indicating the current position of travelling carriage 100 to controller 400 via at least one of first IF 110 and second IF 120, and obtaining communication information 60 indicating a communication slot for communication with any one of a plurality of APs at the current position from controller 400. In the setting step, when it is not possible to perform wireless communication via at least first IF 110, the communication slot currently set to first IF 110 is changed to the communication slot indicated in communication information 60 obtained in the obtaining step.

Accordingly, setting unit 130 can set a suitable communication slot for a communication slot to be used by first IF 110 based on the position of travelling carriage 100. As a result, the certainty of communication for travel system 1 is further improved.

In Example 1, obtaining unit 140 transmits position information 50 to controller 400 via second IF 120 when it is not possible to perform wireless communication via first IF 110 and obtains communication information 60 from controller 400.

In the obtaining step (step S103 and step S104 illustrated in FIG. 6) of the control method of travel system 1 according to Preferred Embodiment 1 in Example 1, position information 50 is transmitted to controller 400 via second IF 120 and communication information 60 is obtained from controller 400 when it is not possible to perform wireless communication via first IF 110.

Accordingly, it is ensured that travelling carriage 100 can obtain communication information 60. As a result, the certainty of communication for travel system 1 is further improved.

Example 2

Figure 7:
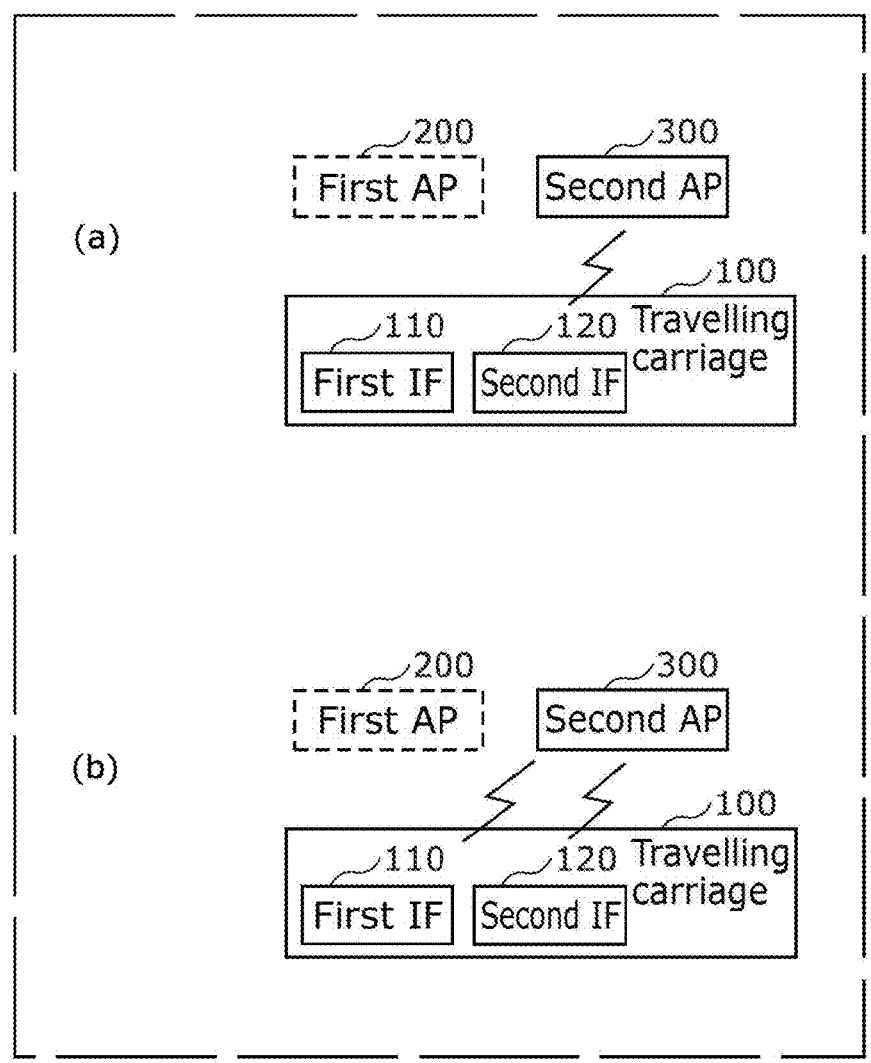
FIG. 7 is an explanatory diagram illustrating Example 2 of the control method of the travel system according to Preferred Embodiment 1 of the present invention.
Figure 8:
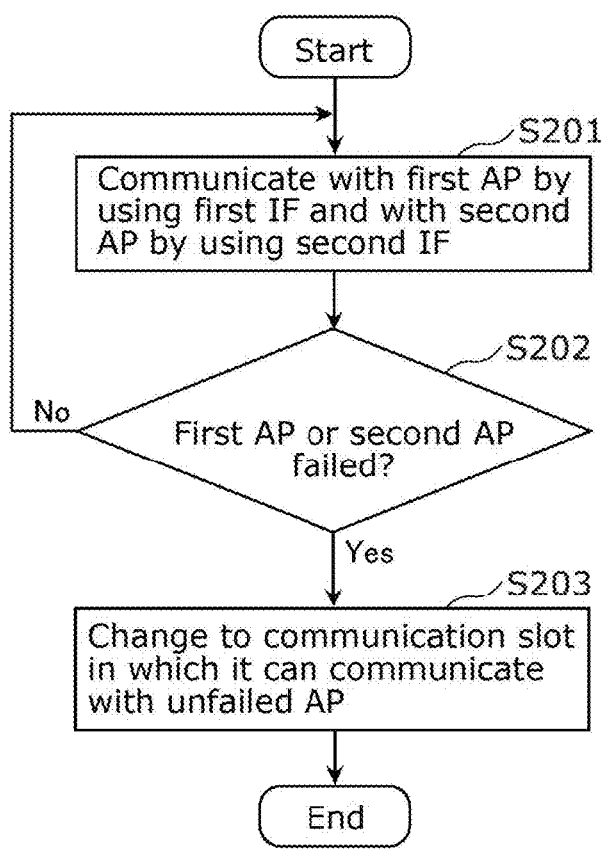
FIG. 8 is a flow chart illustrating Example 2 of the processing procedure of the travel system according to Preferred Embodiment 1 of the present invention.

FIG. 7 is an explanatory diagram illustrating Example 2 of the control method of travel system 1 according to Preferred Embodiment 1. FIG. 8 is a flow chart illustrating Example 2 of the processing procedure of travel system 1 according to Preferred Embodiment 1.

First, it is assumed that travelling carriage 100 is in communication with first AP 200 by using first IF 110 and with second AP 300 by using second IF 120 (step S201). By making a communication in this way, control unit 150 performs control based on the travel instruction received from controller 400.

Next, travelling carriage 100 (for example, control unit 150 or setting unit 130) determines whether first AP 200 or second AP 300 has failed, that is, it is unable to communicate with travelling carriage 100 (step S202). For example, travelling carriage 100 transmits and receives a control signal to and from each of first AP 200 and so on second AP 300 and so on to verify whether mutual communication is possible in a predetermined cycle. In this way, travelling carriage 100 determines whether any of first AP 200 and so on and second AP 300 and so on has failed, that is, it is in an incommunicable state.

When travelling carriage 100 determines that first AP 200 or second AP 300 has not failed (No in step S202), travelling carriage 100 continues the process of step S201.

On the other hand, when travelling carriage 100 determines that first AP 200 or second AP 300 has failed (Yes in step S202), travelling carriage 100 changes the IF that has been in communication with the failed AP to a communication slot in which it can communicate with an unfailed AP (step S203).

For example, in step S202, it is assumed that first AP 200 has failed as illustrated in a view (a) of FIG. 7. Here, it is assumed that first IF 110 is unable to communicate with first AP 200.

In this case, as illustrated in a view (b) of FIG. 7, setting unit 130 changes the communication slot of first IF 110 to a communication slot in which first IF 110 can communicate with second AP 300. Specifically, for example, setting unit 130 changes the 2.4 GHz band channel used by first IF 110 to the 5 GHz band channel in which first IF 110 can communicate with second AP 300. In this way, setting unit 130 changes a communication slot setting such that first IF 110 can also communicate with second AP 300 as with second IF 120 to keep first IF 110 on standby as a backup for second IF 120.

In step S202, although travelling carriage 100 determines whether first AP 200 or second AP 300 has failed, that is, it is unable to communicate with travelling carriage 100, the determination may be made by controller 400. For example, controller 400 transmits and receives a control signal to and from each of first AP 200 and so on and second AP 300 and so on to verify whether mutual communication is possible in a predetermined cycle. In this way, controller 400 determines whether any of first AP 200 and so on and second AP 300 and so on has failed, that is, it is in an incommunicable state. In this case, for example, when it is determined that first AP 200 or second AP 300 has failed, controller 400 transmits the determination result to travelling carriage 100. Setting unit 130 changes the communication slot of first IF 110 or second IF 120 based on the determination result received from controller 400.

As described above, in Example 2, when it is not possible to perform wireless communication via first IF 110, setting unit 130 changes the communication slot set to first IF 110 to the communication slot set to second IF 120. When it is not possible to perform wireless communication via second IF 120, setting unit 130 may change the communication slot set to second IF 120 to the communication slot set to first IF 110.

In the setting step of the control method of travel system 1 according to Preferred Embodiment 1 in Example 2, when it is not possible to perform wireless communication via first IF 110, the communication slot set to first IF 110 is changed to the communication slot set to second IF 120.

Accordingly, first IF 110 can also perform communication in the communication slot used by second IF 120. In this way, for example, even when second IF 120 has failed, travelling carriage 100 can continue communication by using first IF 110. As a result, the certainty of communication for travel system 1 is further improved.

Example 3

Figure 9:
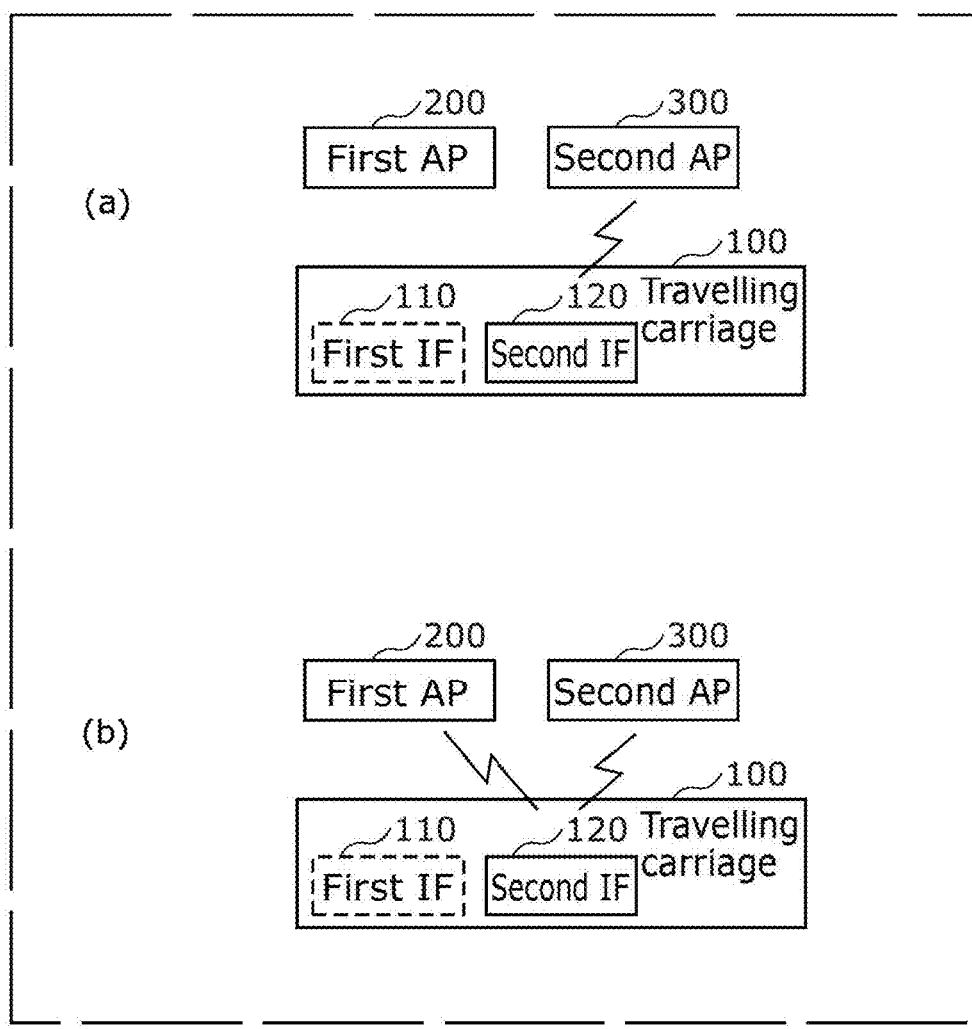
FIG. 9 is an explanatory diagram illustrating Example 3 of the control method of the travel system according to Preferred Embodiment 1 of the present invention.
Figure 10:
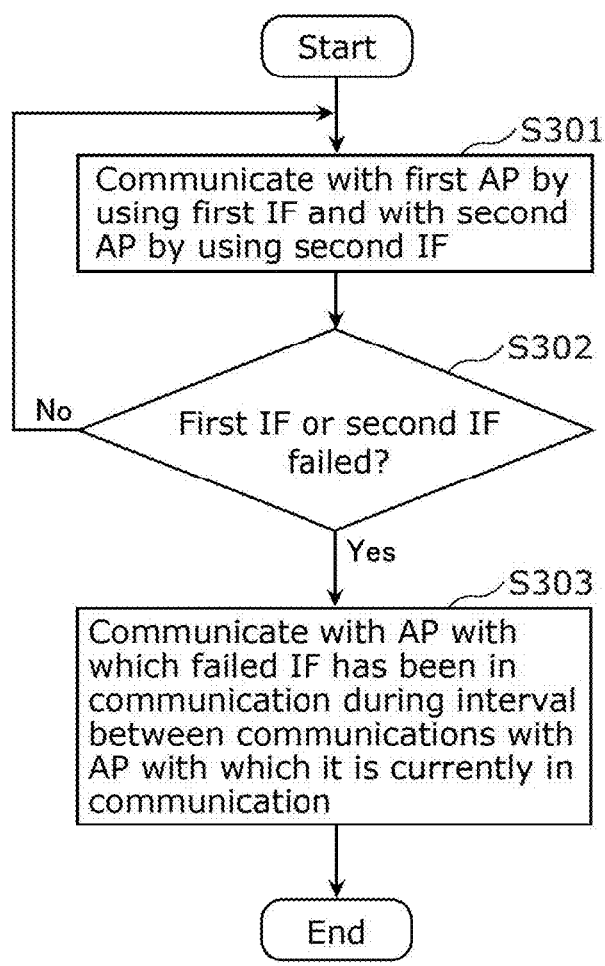
FIG. 10 is a flow chart illustrating Example 3 of the processing procedure of the travel system according to Preferred Embodiment 1 of the present invention.

FIG. 9 is an explanatory diagram illustrating Example 3 of the control method of travel system 1 according to Preferred Embodiment 1. FIG. 10 is a flow chart illustrating Example 3 of the processing procedure of the travel system 1 according to Preferred Embodiment 1.

First, it is assumed that travelling carriage 100 is in communication with first AP 200 by using first IF 110 and with second AP 300 by using second IF 120 (step S301). By making a communication in this way, control unit 150 performs control based on the travel instruction received from controller 400.

Next, travelling carriage 100 (for example, control unit 150 or setting unit 130) determines whether first IF 110 or second IF 120 has failed, that is, it is unable to communicate with travelling carriage 100 (step S302).

When it is determined that first IF 110 or second IF 120 has not failed (No in step S302), travelling carriage 100 continues the process of step S301.

On the other hand, when it is determined that first IF 110 or second IF 120 has failed (Yes in step S302), travelling carriage 100 uses an unfailed IF to communicate with the AP with which the failed and incommunicable IF has been in communication during an interval between communications with the AP with which the unfailed IF is currently in communication (step S303).

For example, in step S302, it is assumed that first IF 110 has failed as illustrated in a view (a) of FIG. 9. Here, it is assumed that first IF 110 is unable to communicate with first AP 200. In this case, as illustrated in a view (b) of FIG. 9, setting unit 130 repeatedly changes the communication slot of second IF 120 so as to be able to communicate with first AP 200 as well. Specifically, for example, control unit 150 uses second IF 120 to communicate with first AP 200 during an interval between communications with second AP 300 with which second IF 120 is currently in communication. For example, first IF 110 and first AP 200 transmits and receives signals to and from second IF 120 and second AP 300 at a predetermined time interval. To this end, setting unit 130 uses second IF 120 to communicate with first AP 200 during an interval between communications with second AP 300 with which second IF 120 is currently in communication, so that the communication slot of second IF 120 is placed into a communicable state of the communication slot with first AP 200.

Alternatively, the determination of a failure of first IF 110 and second IF 120 made in step S302 may be performed by controller 400 instead of travelling carriage 100.

For example, controller 400 transmits and receives a control signal to and from each of first AP 200 and so on second AP 300 and so on to verify whether mutual communication is possible in a predetermined cycle. In this case, while in a communicable state with first AP 200 and so on and second AP 300 and so on, for example, controller 400 determines whether there is a response from travelling carriage 100 to the control signal. Accordingly, controller 400 determines whether any of first IF 110 and so on and second IF 120 and so on has failed, that is, it is in an incommunicable state. In this case, when it is determined that first IF 110 or second IF 120 has failed, for example, controller 400 transmits the determination result to travelling carriage 100. Setting unit 130 changes the communication slot of first IF 110 or second IF 120 based on the determination result received from controller 400.

As described above, in Example 3, when it is not possible to perform wireless communication via first IF 110, setting unit 130 performs a setting in such a way that second IF 120 can perform communication in both the communication slot currently set to second IF 120 and the communication slot currently set to first IF 110. As a matter of course, when it is not possible to perform wireless communication via second IF 120, setting unit 130 performs a setting in such a way that first IF 110 can perform communication in both the communication slot currently set to first IF 110 and the communication slot currently set second IF 120.

In the setting step (specifically, step S303 illustrated in FIG. 10) of the control method of travel system 1 according to Preferred Embodiment 1 in Example 3, when it is not possible to perform wireless communication via first IF 110, a setting is performed in such a way that second IF 120 can perform communication in both the communication slot currently set to second IF 120 and the communication slot currently set to first IF 110.

Accordingly, second IF 120 is available for communication with both first AP 200 and so on and second AP 300 and so on. As a result, the certainty of communication for travel system 1 is further improved.

Example 4

Figure 11:
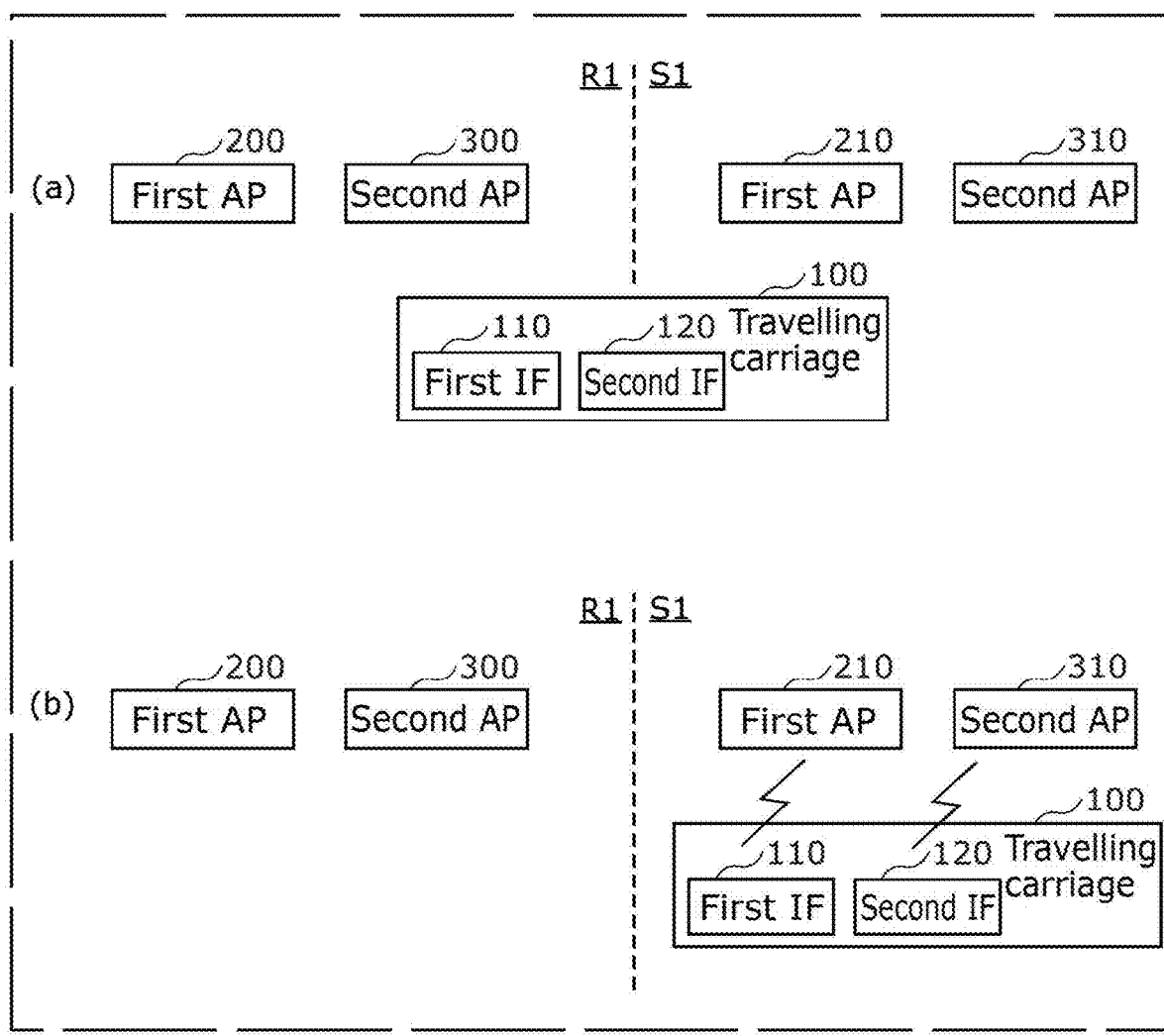
FIG. 11 is an explanatory diagram illustrating Example 4 of the control method of the travel system according to Preferred Embodiment 1 of the present invention.
Figure 12:
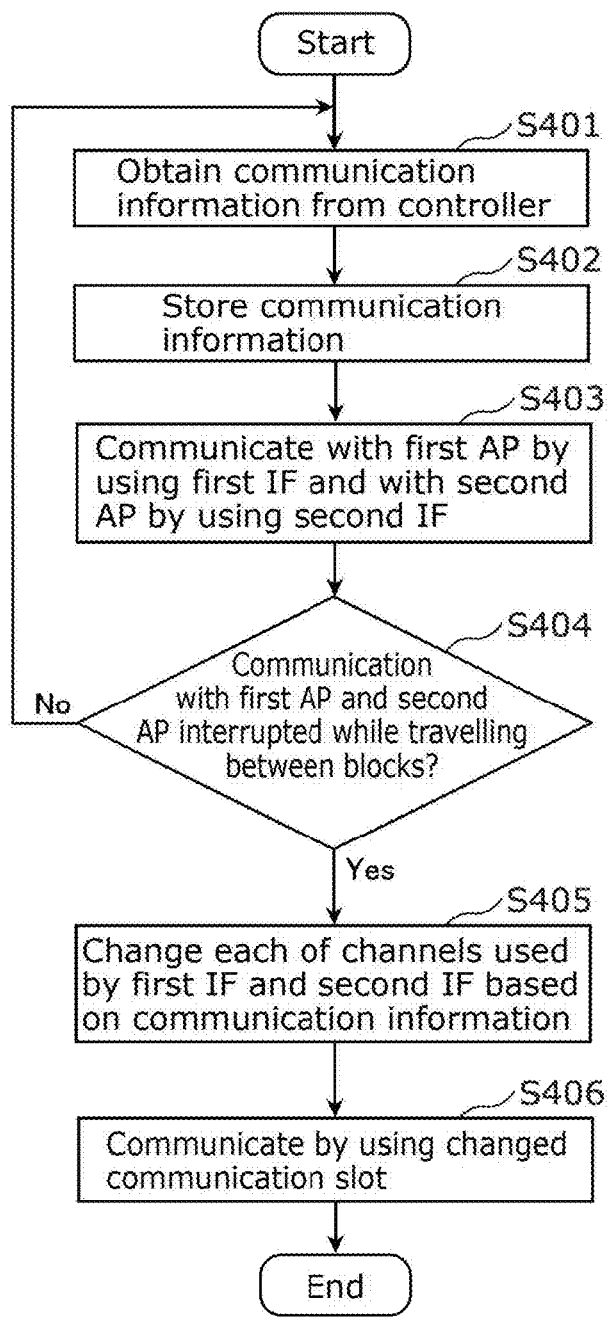
FIG. 12 is a flow chart illustrating Example 4 of the processing procedure of the travel system according to Preferred Embodiment 1 of the present invention.

FIG. 11 is an explanatory diagram illustrating Example 4 of the control method of travel system 1 according to Preferred Embodiment 1. FIG. 12 is a flow chart illustrating Example 4 of the processing procedure of travel system 1 according to Preferred Embodiment 1.

First, it is assumed that travelling carriage 100 is in communication with first AP 200 by using first IF 110 and with second AP 300 by using second IF 120. Obtaining unit 140 obtains communication information 60 from controller 400 (step S401). Obtaining unit 140 transmits position information 50 of travelling carriage 100, for example, in step S401. Upon receipt of position information 50, controller 400 transmits communication information 60 indicating a communication slot for communication with first AP and second AP in the next block to which travelling carriage 100 is travelling to travelling carriage 100.

For example, as illustrated in a view (a) in FIG. 11, it is assumed that travelling carriage 100 travels from block R1 to block S1. In this case, in step S401, obtaining unit 140 obtains communication information 60 in block S1 from controller 400. Specifically, obtaining unit 140 transmits position information 50 of travelling carriage 100. Upon receipt of position information 50, controller 400 transmits communication information 60 indicating a communication slot for communication with first AP 210 and second AP 310 in next block S1 to which travelling carriage 100 is travelling to travelling carriage 100.

Next, obtaining unit 140 stores communication information 60 obtained in step S401 in storage unit 160 (step S402).

Next, control unit 150 communicates with first AP 200 by using first IF 110 and communicates with second AP 300 by using second IF 120 to receive a control signal from controller 400 and performs control based on the received control signal (step S403).

Next, while it is travelling between the blocks, travelling carriage 100 determines whether communication with both first AP 200 and second AP 300 is interrupted, that is, whether communication is not possible (step S404).

When it is determined that communication with first AP 200 and second AP 300 is not interrupted while travelling carriage 100 is travelling between the blocks (No in step S404), travelling carriage 100 (for example, control unit 150) returns the process to step S401.

On the other hand, when it is determined that communication with both first AP 200 and second AP 300 is interrupted while travelling carriage 100 is travelling between the blocks (Yes in step S404), setting unit 130 changes communication slots used by first IF 110 and second IF 120 to the respective communication slots indicated in communication information 60 based on communication information 60 stored in storage unit 160 by obtaining unit 140 in step S402 (step S405). For example, in step S405, setting unit 130 changes the channel used by first IF 110 to 2.4 GHz band channel 6 in which it can communicate with first AP 210 and the channel used by second IF 120 to 5 GHz band channel 40 in which it can communicate with second AP 310.

Next, for example, as illustrated in a view (b) of FIG. 11 and FIG. 12, control unit 150 communicates with controller 400 via first IF 110 and first AP 210 by using the communication slot changed by setting unit 130 (step S406).

As described above, in Example 4, before first IF 110 and second IF 120 lose wireless communication, obtaining unit 140 transmits position information 50 to controller 400 via at least one of first IF 110 and second IF 120, and obtains communication information 60 from controller 400, and setting unit 130 changes the communication slot currently set to first IF 110 to a communication slot indicated in communication information 60 after both first IF 110 and second IF 120 loses wireless communication. As a matter of course, after first IF 110 and second IF 120 have lost wireless communication, setting unit 130 may change the communication slot currently set to second IF 120 to a communication slot indicated in communication information 60.

In the obtaining step of the control method of travel system 1 according to Preferred Embodiment 1 in Example 4, before first IF 110 and the second IF 120 lose wireless communication, position information 50 is transmitted to controller 400 via at least one of first IF 110 and second IF 120, and communication information 60 is obtained from controller 400. In the setting step, after first IF 110 and second IF 120 have lost wireless communication, the communication slot currently set to first IF 110 is changed to a communication slot indicated in communication information 60.

Accordingly, it is further ensured that travelling carriage 100 can obtain communication information 60. As a result, the certainty of communication for travel system 1 is further improved.

For example, obtaining unit 140 obtains the communication slot set to first AP 200 and so on and the communication slot set to second AP 300 and so on, both the communication slots allowing communication at the current position, from controller 400 as communication information 60, and setting unit 130 changes each of the communication slots set to first IF 110 and second IF 120 based on communication information 60 obtained by obtaining unit 140.

For example, in obtaining step of the control method of travel system 1 according to Preferred Embodiment 1, the communication slot set to first AP 200 and so on and the communication slot set to second AP 300 and so on, both the communication slots allowing communication at the current position, are obtained from controller 400 as communication information 60, and in setting step, each of the communication slot set to first IF 110 and second IF 120 is changed based on communication information 60 obtained in obtaining step.

Accordingly, even when it is not possible to wirelessly communicate with both first AP 200 and so on and second AP 300 and so on, for example, setting unit 130 can set a suitable communication slot for each of communication slots to be used by first IF 110 and second IF 120 based on communication information 60. As a result, the certainty of communication for travel system 1 is further improved.

Although in step S401 and step S402, obtaining unit 140 obtains communication information 60 and stores obtained communication information 60 in storage unit 160, storage unit 160 may, for example, have stored therein association information 70 indicating association between the current position of travelling carriage 100 and a communication slot in which travelling carriage 100 can communicate with any one of a plurality of APs at the current position. According to the configuration, when first IF 110 and second IF 120 have lost communication simultaneously, setting unit 130 can suitably change the communication slots set to each of first IF 110 and second IF 120 based on association information 70 stored in storage unit 160. In this case, travelling carriage 100 and controller 400 need not perform step S401 and step S402.

In this way, for example, travel system 1 further includes storage unit 160 that has stored therein association information 70 indicating association between the current position of travelling carriage 100 and a communication slot in which travelling carriage 100 can communicate with any one of a plurality of APs at the current position, and when communication information 60 cannot be obtained from controller 400 before first IF 110 and second IF 120 lose wireless communication, obtaining unit 140 obtains a communication slot in which travelling carriage 100 can communicate with any one of a plurality of AP at the current position of travelling carriage 100 based on association information 70.

For example, the control method of travel system 1 according to Preferred Embodiment 1 further includes a storing step of travelling carriage 100 storing association information 70 indicating association between the current position of travelling carriage 100 and a communication slot in which travelling carriage 100 can communicate with any one of a plurality of APs at the current position, and in the obtaining step, when communication information 60 cannot be obtained from controller 400 before first IF 110 and second IF 120 lose wireless communication, a communication slot in which travelling carriage 100 can communicate with any one of a plurality of APs is obtained based on association information 70 at the current position of travelling carriage 100.

Accordingly, even when it is not possible to wirelessly communicate with both first AP 200 and so on and second AP 300 and so on, for example, it is ensured that travelling carriage 100 can obtain communication slots set to first IF 110 and second IF 120 for communication with first AP 200 and so on and second AP 300 and so on. As a result, the certainty of communication for travel system 1 is further improved.

Example 5

Figure 13:
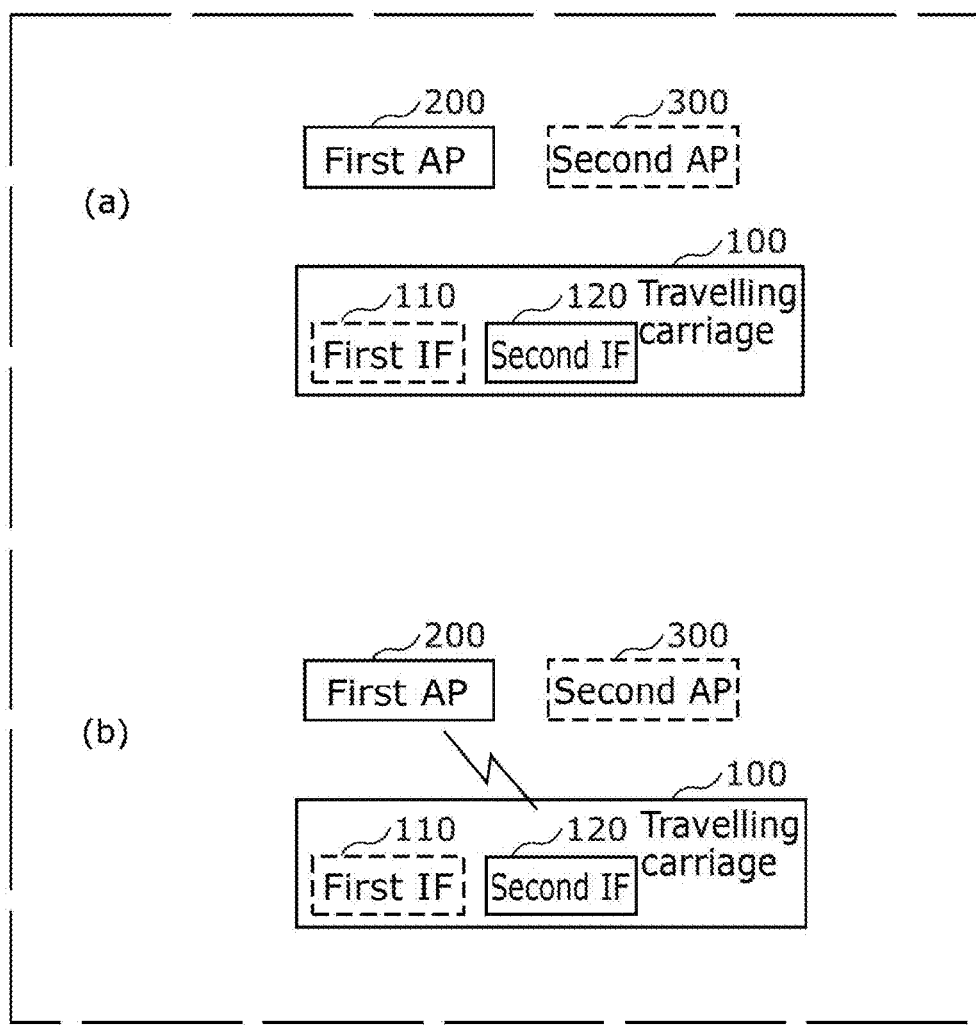
FIG. 13 is an explanatory diagram illustrating Example 5 of the control method of the travel system according to Preferred Embodiment 1 of the present invention.
Figure 14:
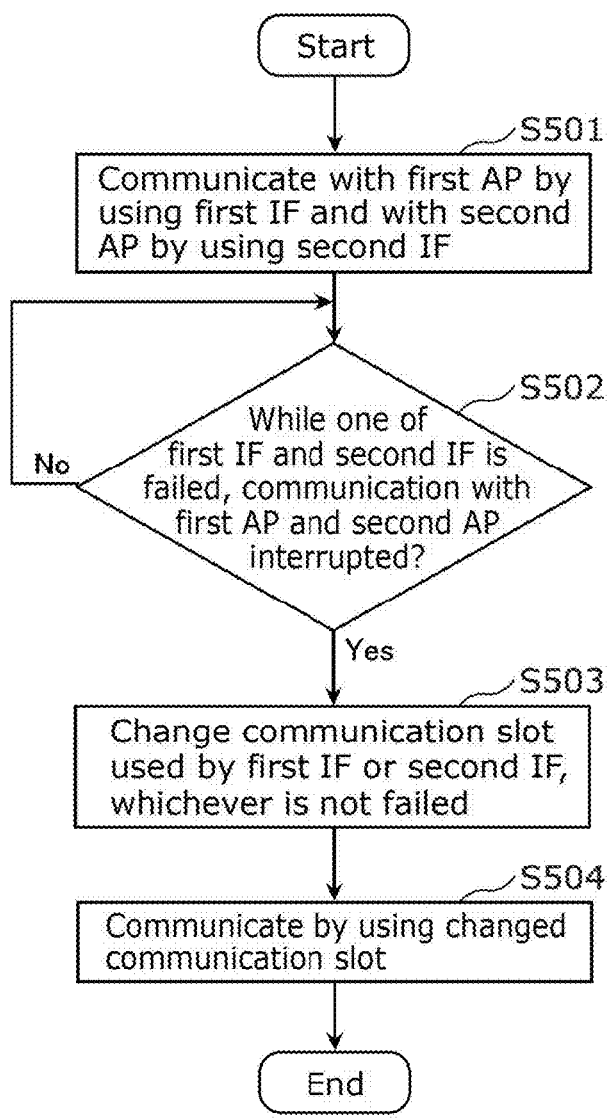
FIG. 14 is a flow chart illustrating Example 5 of the processing procedure of the travel system according to Preferred Embodiment 1 of the present invention.

FIG. 13 is an explanatory diagram illustrating Example 5 of the control method of travel system 1 according to Preferred Embodiment 1. FIG. 14 is a flow chart illustrating Example 5 of the processing procedure of travel system 1 according to Preferred Embodiment 1.

First, control unit 150 communicates with first AP 200 by using first IF 110 and communicates with second AP 300 by using second IF 120 to receive a control signal from controller 400 and performs control based on the received travel instruction (step S501).

Next, in a situation where one of first IF 110 and second IF 120 has failed, travelling carriage 100 (for example, control unit 150) determines whether communication with both first AP 200 and second AP 300 is interrupted, that is, whether communication is not possible (step S502).

In a situation where only one of first IF 110 and second IF 120 has failed, control unit 150 repeatedly performs step S502 until it is determined that communication with both first AP 200 and second AP 300 is interrupted.

On the other hand, when control unit 150 determines that communication with both first AP 200 and second AP 300 is interrupted in a situation where only one of first IF 110 and second IF 120 has failed (Yes in step S502), setting unit 130 changes the communication slot used by first IF 110 or second IF 120, whichever has not failed, to the communication slot used by the failed IF (step S503).

Next, control unit 150 communicates with controller 400 by using the unfailed IF the communication slot of which is changed by setting unit 130 (step S504).

In step S503, for example, it is assumed that first IF 110 and second AP 300 have failed simultaneously as illustrated in a view (a) of FIG. 13. In this case, travelling carriage 100 can communicate with the unfailed AP because second IF 120 has not failed although it is not able to communicate with first AP 200 because first IF 110 has failed. In Example 5, therefore, as illustrated in a view (b) of FIG. 13, the unfailed and communicable first AP 200, which is the communication counterpart of first IF 110 that has failed and incommunicable, and second IF 120 communicate with each other under the condition of Yes in step S502.

As described above, in Example 5, when first IF 110 and first AP 200 and so on are not able to wirelessly communicate with each other and second IF 120 and second AP 300 and so on are not able to wirelessly communicate with each other, setting unit 130 changes the communication slot currently set to second IF 120 to the communication slot set to first IF 110. When second IF 120 has failed, setting unit 130 may change the communication slot currently set to first IF 110 to the communication slot set to second IF 120.

In the setting step of the control method of travel system 1 according to Preferred Embodiment 1 in Example 5, when first IF 110 and first AP 200 and so on are not able to wirelessly communicate with each other and first IF 110 and second IF 120 are not able to wirelessly communicate with each other, the communication slot currently set to second IF 120 is changed to the communication slot set to first IF 110.

Accordingly, for example, even when first IF 110 and second AP 300 and so on have failed, travelling carriage 100 can continue to wirelessly communicate with controller 400 by second IF 120 and first AP 200 and so on. As a result, the certainty of communication for travel system 1 is further improved.

Preferred Embodiment 2

A travel system according to Preferred Embodiment 2 will now be described.

In the description of the travel system according to Preferred Embodiment 2, components that are the same as those in travel system 1 according to Preferred Embodiment 1 will be given the same reference signs and part of their description may be simplified or omitted.

Figure 15:
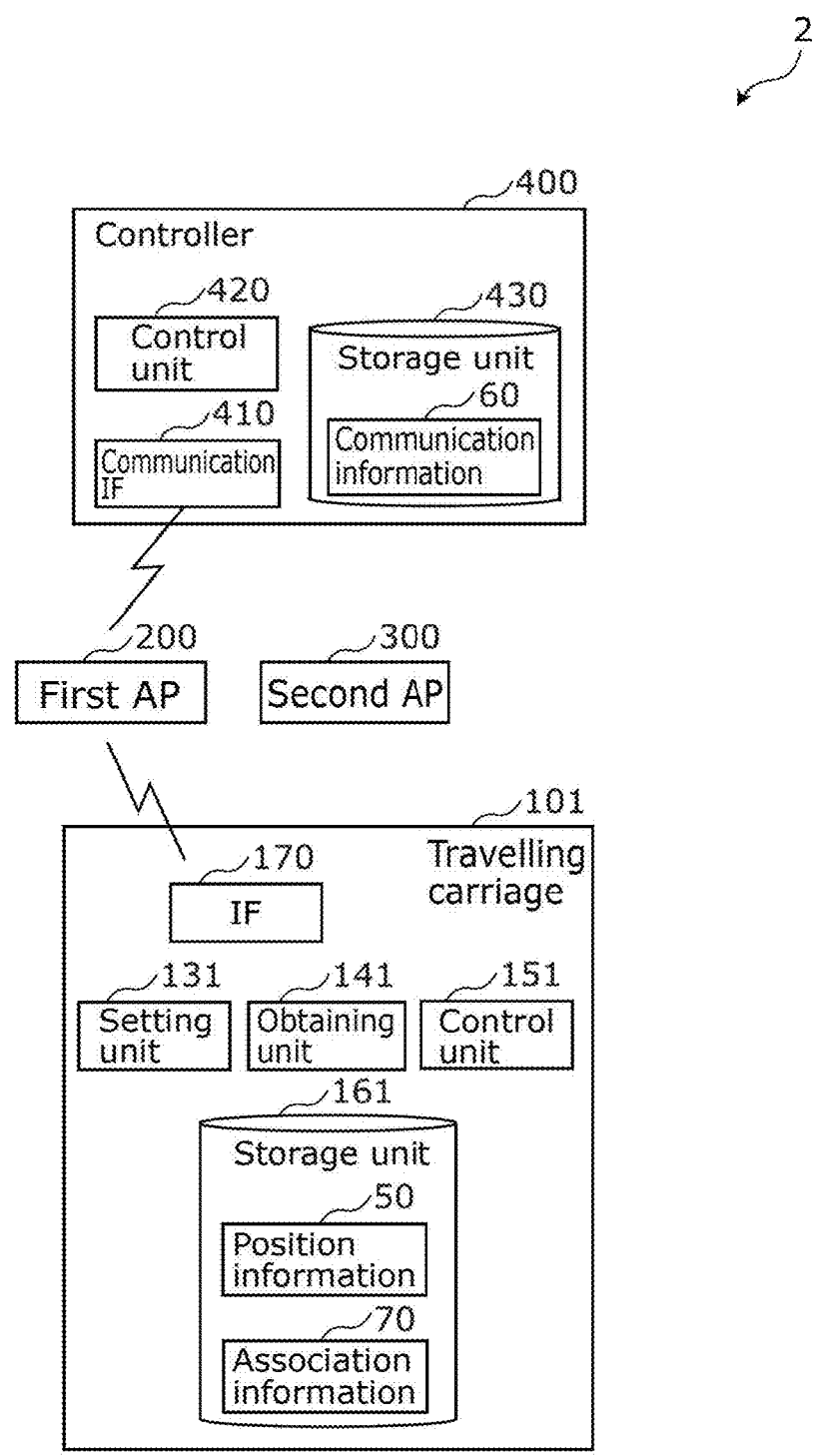
FIG. 15 is a block diagram illustrating a functional configuration of a travel system according to Preferred Embodiment 2 of the present invention.

FIG. 15 is a block diagram illustrating a functional configuration of travel system 2 according to Preferred Embodiment 2.

As with travel system 1 according to Preferred Embodiment 1, travel system 2 is a guided travel system that allows travelling carriage 101 to travel under computer control by controller 400 on track 5, which is a travelling path provided on the ceiling or floor of the facility (see FIG. 1). Travelling carriage 101 moves to an instructed spot or transports an article according to control by controller 400. As with travel system 1 illustrated in FIG. 1, travel system 2 includes travelling carriage 100, a plurality of first access points (first AP) 200, 210, 220, and 230, a plurality of second access points (second AP) 300, 310, 320, and 330, and controller 400. Travel system 2 is different from travel system 1 according to Preferred Embodiment 1 in the configuration of travelling carriage 100.

Travelling carriage 101 is an unmanned travelling vehicle that travels on a predetermined track 5 (see FIG. 1) without a person on board and travels under control of controller 400.

In contrast to travelling carriage 100 according to Preferred Embodiment 1, travelling carriage 101 includes one wireless interface (IF 170). Travelling carriage 101 establishes a communication link with a plurality of access points and communicates with controller 400 through wireless communication by using the communication link.

In travel system 2, as with travel system 1 illustrated in FIG. 1, areas where travelling carriage 101 can travel, specifically, locations on track 5 are segmented into a plurality of blocks. Depending on which block it belongs, travelling carriage 101 establishes a communication link with suitable first AP 200 and so on and second AP 300 and so on. In other words, travelling carriage 101 autonomously selects an AP with which travelling carriage 101 is to establish a communication link depending on its own position. For example, travelling carriage 101 wirelessly communicates with first AP 200 and so on and wirelessly communicates with second AP 300 and so on when it is unable to wirelessly communicate with first AP 200 and so on.

As with travel system 1 according to Preferred Embodiment 1, travel system 2 includes a plurality of access points that include a plurality of first APs 200 and so on that wirelessly communicate with travelling carriage 101 and a plurality of second APs 300 that wirelessly communicate with travelling carriage 101 in a communication slot different from that of first AP 200 and so on. Further, controller 400 receives position information 50 indicating the current position of travelling carriage 101 from travelling carriage 101 via any one of a plurality of APs, and transmits a travel instruction to control travel of travelling carriage 101 to travelling carriage 101.

Each of a plurality of first APs 200 and so on includes a communication area that partially overlaps that of adjacent first AP. Each of a plurality of second APs 300 and so on includes a communication area that partially overlaps that of adjacent second AP. Further, each of a plurality of first APs 200 and so on includes a communication area that at least partially overlaps that of any one of a plurality of second APs 300 and so on.

Next, a specific configuration of travelling carriage 101 included in travel system 2 will be described.

Travelling carriage 101 includes IF 170, setting unit 131, obtaining unit 141, control unit 151, and storage unit 160.

IF 170 is a communication interface such as a wireless LAN compliant with standards such as the IEEE802.11a, b, g, n standards, for example. IF 170 performs transmission/reception of data, establishes and disconnects a communication link, and the like under control of control unit 151.

IF 170 is a communication interface that can wirelessly communicate with first AP 200 and so on and second AP 300 and so on. For example, IF 170 first wirelessly communicates with first AP 200 and so on in a 2.4 GHz band communication band. When it is not possible to wirelessly communicate with first AP 200 and so on, IF 170 wirelessly communicates with second AP 300 and so on in a 5 GHz band communication band.

In the present preferred embodiment, although description is made on the premise that travelling carriage 101 is predefined to first wirelessly communicate with first AP 200 and so on by using IF 170, it may be predefined to first wirelessly communicate with second AP 300 and so on.

When it is not possible to perform wireless communication via IF 170, setting unit 131 sets a communication slot that is different from the communication slot currently set to IF 170. When wireless communication with first AP 200 is interrupted, for example, setting unit 131 changes the communication slot used for IF 170 from channel 1 to channel 6.

Setting unit 131 is implemented by, for example, a microcontroller or the like. Specifically, setting unit 131 is implemented by a non-volatile memory that stores a program, a volatile memory that serves as a temporary storage area to execute the program, input/output ports, a processor that executes the program, and the like. Setting unit 131 may be implemented by special purpose electronics or circuitry that performs operations.

Obtaining unit 141 transmits position information 50 indicating the current position of travelling carriage 101 to controller 400 via IF 170, and obtains communication information 60 (see FIG. 3) indicating a communication slot for communication with second AP 300 and so on at the current position from controller 400. Obtaining unit 141 is a processing unit that controls IF 170 to transmit position information 50 and receive communication information 60, for example.

Obtaining unit 141 is implemented by, for example, a microcontroller or the like. Specifically, obtaining unit 141 is implemented by a non-volatile memory that stores a program, a volatile memory that serves as a temporary storage area to execute the program, input/output ports, a processor that executes the program, and the like. Obtaining unit 141 may be implemented by special purpose electronics or circuitry that performs operations.

Alternatively, setting unit 131 and obtaining unit 141 may be implemented by one CPU or may be implemented by different CPUs, for example.

When it is not possible to perform wireless communication via IF 170, for example, setting unit 131 changes the communication slot currently set to IF 170 to a communication slot indicated in communication information 60 obtained by obtaining unit 141.

As with travelling carriage 100 according to Preferred Embodiment 1, travelling carriage 101 includes a sensor that senses electromagnetic wave or light to obtain its own current position, for example. Obtaining unit 141 obtains the current position of travelling carriage 101 by, for example, light received from a plurality of optical transmitters disposed along track 5 (see FIG. 1), and transmits obtained position information 50 indicating the current position to controller 400.

Control unit 151 is a processing unit that controls travel of travelling carriage 100 or the like. Control unit 151 controls, for example, IF 170 to receive a travel instruction such as a travel command from controller 400, and controls travel of travelling carriage 101 based on received travel instruction.

Control unit 151 is implemented by, for example, a microcontroller or the like. Specifically, control unit 151 is implemented by a non-volatile memory that stores a program, a volatile memory that serves as a temporary storage area to execute the program, input/output ports, a processor that executes the program, and the like. Control unit 151 may be implemented by special purpose electronics or circuitry that performs operations.

Control unit 151 may be implemented by one CPU along with setting unit 131 and obtaining unit 141 or may be implemented by a different CPU from the other units.

Storage unit 161 is a storage such as HDD, SSD, and eMMC that stores data received from controller 400. Storage unit 161 stores a control program executed by each of setting unit 131, obtaining unit 141, and control unit 151, for example.

For example, storage unit 161 has stored therein association information 70 indicating association between the current position of travelling carriage 101 and a communication slot in which travelling carriage 101 can communicate with any one of a plurality of APs (specifically, first AP 200 and so on and second AP 300 and so on) at the current position. As described above, when obtaining unit 141 can obtain communication information 60 from controller 400 by using IF 170, then setting unit 131 can change the communication slot of IF 170 based on communication information 60 obtained by obtaining unit 141. Here, there may be a case in which travelling carriage 101 becomes unable to communicate with first AP 200 due to failure or the like of first AP 200, for example. In this case, when communication information 60 cannot be obtained from controller 400 before IF 170 becomes unable to wirelessly communicate with first AP 200, obtaining unit 141 obtains a communication slot in which the travelling carriage can communicate with any one of plurality of APs at the current position of travelling carriage 101 based on association information 70. In other words, when communication information 60 cannot be obtained from controller 400 before wireless communication with first AP 200 via IF 170 is lost, control unit 151 changes the communication slot set to IF 170 to a communication slot in which travelling carriage 101 can communicate with second AP 300 and so on based on association information 70 stored in storage unit 161. In this way, control unit 151 continues to communicate with controller 400 via IF 170 and second AP 300 and so on.

Next, with reference to FIGS. 16 to 19, travelling procedure of travelling carriage 101 according to Preferred Embodiment 2 will be described. Note that in FIG. 16 and FIG. 18, some of the components of travel system 2 such as components of travelling carriage 101 and controller 400 are not illustrated. Further, FIGS. 16 to 19 illustrate the case in which IF 170 is already in wireless communication with first AP 200.

Example 1

Figure 16:
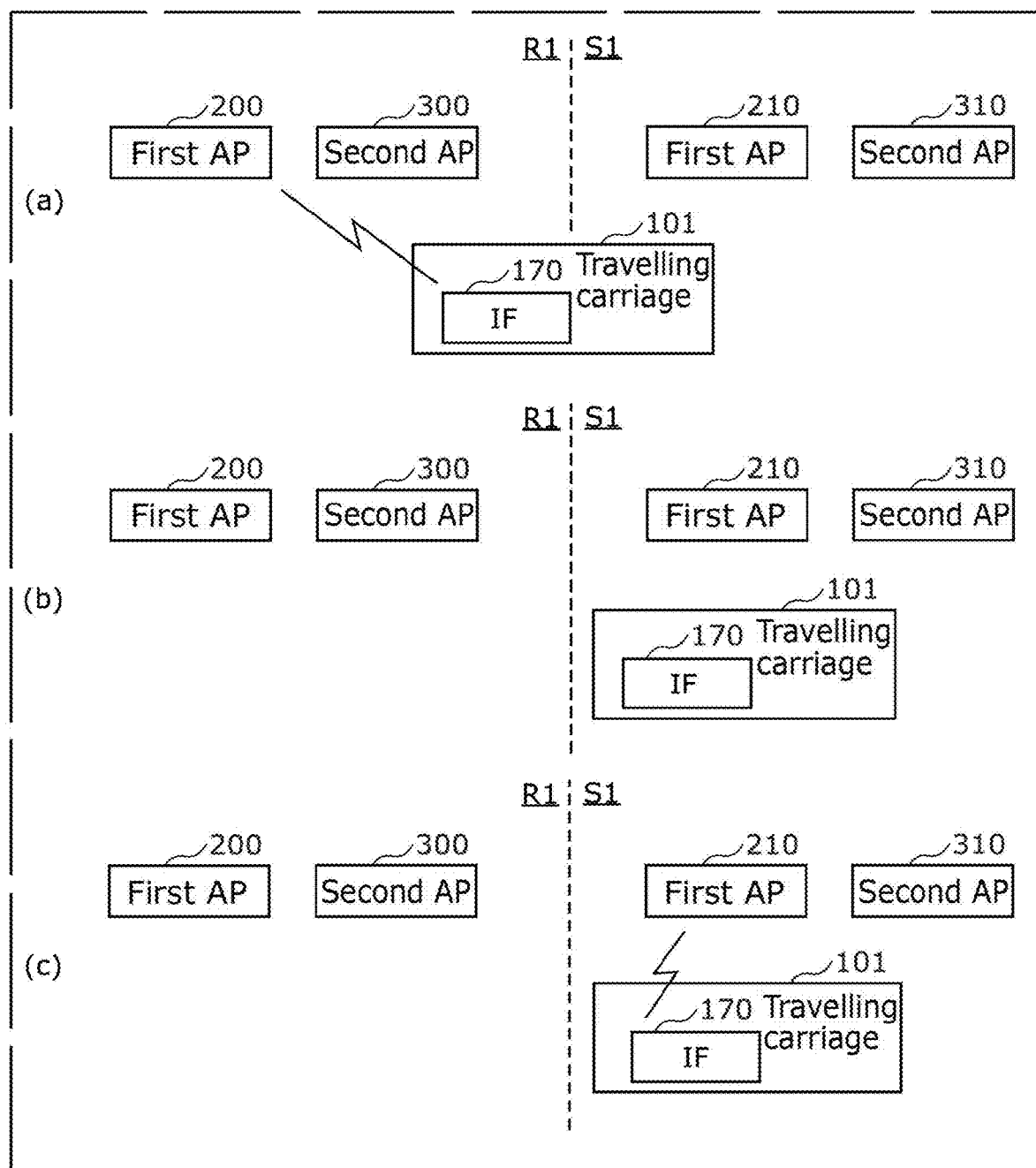
FIG. 16 is an explanatory diagram illustrating Example 1 of a control method of the travel system according to Preferred Embodiment 2 of the present invention.
Figure 17:
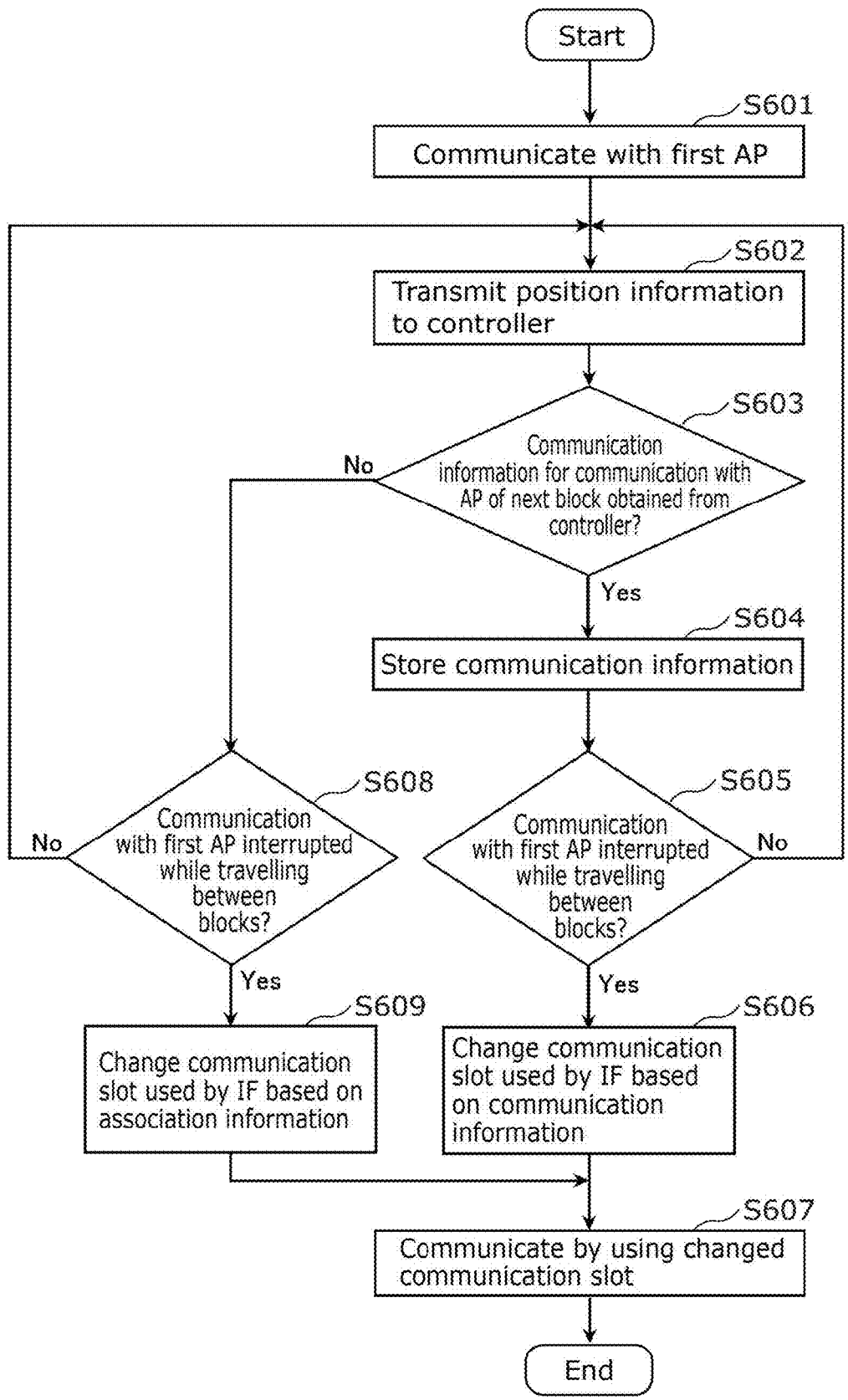
FIG. 17 is a flow chart illustrating Example 1 of a processing procedure of the travel system according to Preferred Embodiment 2 of the present invention.

FIG. 16 is an explanatory diagram illustrating Example 1 of a control method of travel system 2 according to Preferred Embodiment 2. FIG. 17 is a flow chart illustrating Example 1 of a processing procedure of travel system 2 according to Preferred Embodiment 2.

First, in a view (a) of FIG. 16 and FIG. 17, it is assumed that travelling carriage 101 is in communication with first AP 200 (step S601). By making a communication in this way, control unit 151 receives a travel instruction such as a travel command from controller 400 via IF 170, and performs control (for example, travel control of travelling carriage 101) based on the received travel instruction.

Next, travelling carriage 101 transmits position information 50 indicating its own current position to controller 400 (step S602). Specifically, in step S602, obtaining unit 141 transmits position information 50 indicating the current position of travelling carriage 101 obtained in the manner as described above to controller 400 via IF 170.

Next, obtaining unit 141 determines whether communication information 60 for communication with an AP (here, for example, first AP 210 or second AP 310) of the next block (here, block S1) is obtained from controller 400 (step S603).

When it is determined that communication information 60 for communicating an AP of the next block is obtained from controller 400 (i.e., communication information 60 is obtained) in step S603 (Yes in step S603), obtaining unit 141 stores the obtained communication information 60 in storage unit 161 (step S604).

Next, travelling carriage 101 determines whether communication with first AP 200 is interrupted while it is travelling between the blocks, that is, whether wireless communication is not possible (step S605). For example, in step S605, it is assumed that travelling carriage 101 travels from block R1 to block S1 as illustrated in a view (a) of FIG. 16.

When it is determined that communication with first AP 200 is not interrupted while travelling carriage 101 is travelling between the blocks (No in step S605), travelling carriage 101 (for example, control unit 151) returns the process to step S602.

On the other hand, as illustrated in a view (b) of FIG. 16, when it is determined that communication with first AP 200 is interrupted while travelling carriage 101 is travelling between the blocks (Yes in step S605), setting unit 131 changes the communication slot of IF 170 to a communication slot indicated in communication information 60 such that IF 170 can communicate with an AP (first AP 210 or second AP 310) located in block S1 based on communication information 60 stored in storage unit 161 by obtaining unit 141 in step S604 (step S606). For example, in step S606, setting unit 131 changes the channel used by IF 170 from 2.4 GHz band channel in which IF 170 can communicate with first AP 200 to 2.4 GHz band channel 6 in which it can communicated with first AP 210.

Next, for example, as illustrated in a view (c) of FIG. 16 and FIG. 6, control unit 151 communicates with controller 400 via IF 170 by using the communication slot changed by setting unit 131 (step S607). In this way, communication between travelling carriage 101 and controller 400 is maintained.

In step S603, when it is determined that obtaining unit 141 does not obtain communication information 60 for communication with an AP of the next block from controller 400 (i.e., communication information 60 is not obtained) (No in step S603), travelling carriage 101 determines whether communication with first AP 200 is interrupted while it is travelling between the blocks, that is, whether wireless communication is not possible (step S608).

When it is determined that communication with first AP 200 is not interrupted while travelling carriage 101 is travelling between the blocks (No in step S608), travelling carriage 101 (for example, control unit 151) returns the process to step S602.

On the other hand, when it is determined that communication with first AP 200 is interrupted while travelling carriage 101 travels between the blocks without communication information 60 being obtained (Yes in step S608), setting unit 131 changes the communication slot of IF 170 to a communication slot indicated in association information 70 such that IF 170 can communicate with an AP (first AP 210 or second AP 310) located in block S1 based on association information 70 stored in storage unit 161 in advance (step S609).

In this way, when communication information 60 is successfully obtained from controller 400, travelling carriage 101 changes a communication slot to be used by IF 170 based on communication information 60, which is latest information for communication with a plurality of APs. On the other hand, when communication information 60 is not obtained from controller 400, travelling carriage 101 changes a communication slot to be used by IF 170 based on association information 70 stored in storage unit 161 in advance.

Travelling carriage 101 may update association information 70 when communication information 60 is obtained.

Example 2

Figure 18:
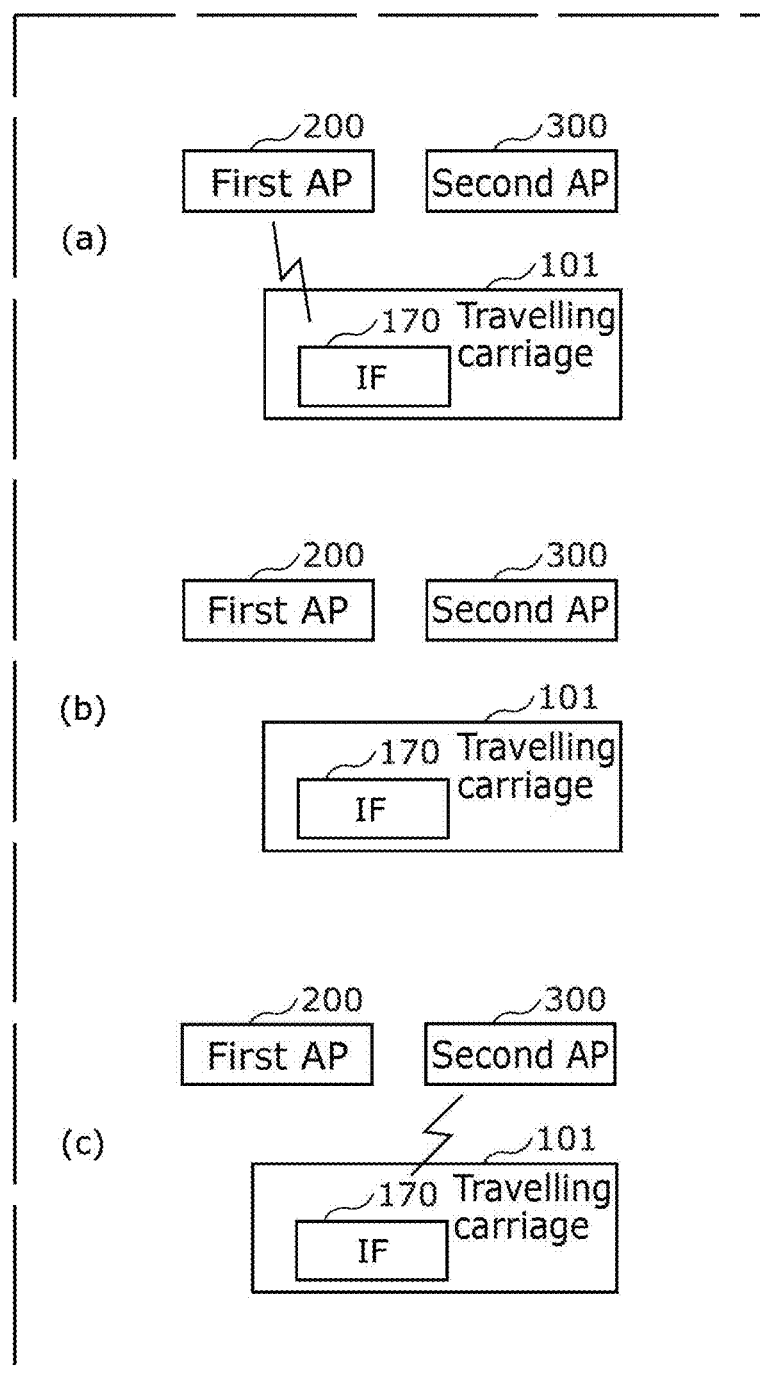
FIG. 18 is an explanatory diagram illustrating Example 2 of a control method of the travel system according to Preferred Embodiment 2 of the present invention.
Figure 19:
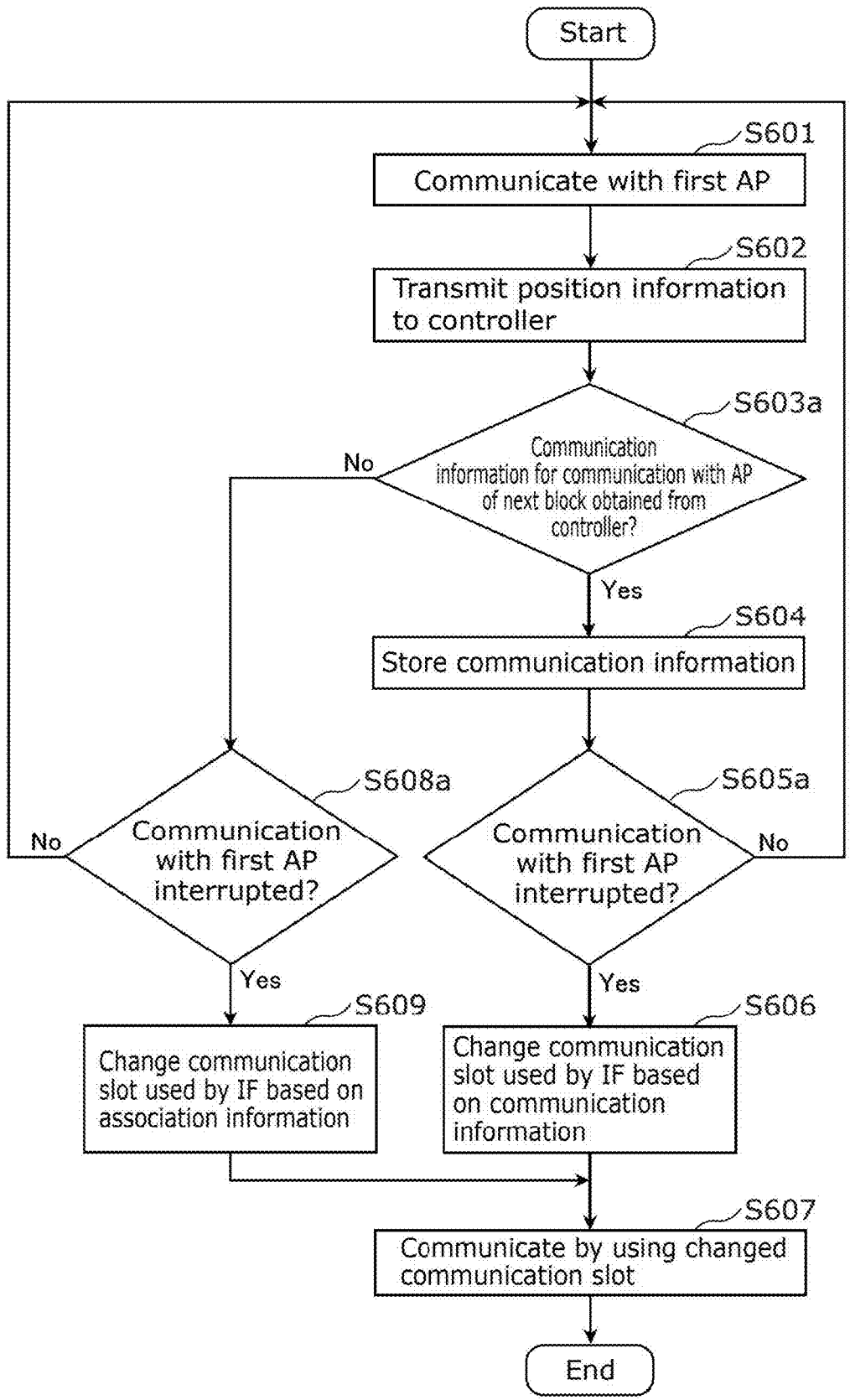
FIG. 19 is a flow chart illustrating Example 2 of the processing procedure of the travel system according to Preferred Embodiment 2 of the present invention.

FIG. 18 is an explanatory diagram illustrating Example 2 of a control method of travel system 2 according to Preferred Embodiment 2. FIG. 19 is a flow chart illustrating Example 2 of the processing procedure of travel system 2 according to Preferred Embodiment 2.

First, as illustrated in a view (a) of FIG. 18 and FIG. 19, it is assumed that travelling carriage 101 is in communication with first AP 200 (step S601).

Next, travelling carriage 101 transmits position information 50 indicating its own current position to controller 400 (step S602). Specifically, in step S602, obtaining unit 141 transmits position information 50 indicating the current position of travelling carriage 101 obtained in the manner as described above to controller 400 via IF 170.

Next, obtaining unit 141 determines whether communication information 60 for communication with second AP 300 in the block (block R1) in which the host carriage is located is obtained from controller 400 (step S603a).

In step S603a, when it is determined that communication information 60 for communication with second AP 300 in the block in which the host carriage is located is obtained from controller 400 (i.e., communication information 60 is obtained) (Yes in step S603a), obtaining unit 141 stores obtained communication information 60 in storage unit 161 (step S604).

Next, travelling carriage 101 determines whether communication with first AP 200 is interrupted while it does not travel between the blocks, that is, whether wireless communication is not possible due to failure of first AP 200, communication failure, or the like (step S605a). For example, in step S605a, as illustrated in a view (b) of FIG. 18, it is assumed that travelling carriage 101 is located in block R1.

When it is determined that communication with first AP 200 is not interrupted while travelling carriage 101 does not travel between the blocks (No in step S605a), travelling carriage 101 (for example, control unit 151) returns the process to step S601.

On the other hand, as illustrated in a view (b) of FIG. 18, when it is determined that communication with first AP 200 is interrupted while travelling carriage 101 does not travel between the blocks (Yes in step S605a), setting unit 131 changes the communication slot of IF 170 to a communication slot indicated in communication information 60 such that IF 170 can communicate with second AP 300 located in block S1 based on communication information 60 stored in storage unit 161 by obtaining unit 141 in step S604 (step S606). For example, in step S606, setting unit 131 changes the channel to be used by IF 170 from a 2.4 GHz band channel in which IF 170 can communicate with first AP 200 to a 5 GHz band channel in which it can communicate with second AP 300.

Next, for example, as illustrated in a view (c) of FIG. 18 and FIG. 19, control unit 151 communicates with controller 400 via IF 170 and second AP 300 by using the communication slot changed by setting unit 131 (step S607). In this way, communication between travelling carriage 101 and controller 400 is maintained.

In step S603a, when obtaining unit 141 determines that communication information 60 for communication with second AP 300 in the block in which the host carriage is located is obtained from controller 400 is not obtained (i.e., communication information 60 is not obtained) (No in step S603a), travelling carriage 101 determines whether communication with first AP 200 is interrupted while it does not travel between the blocks, that is, whether wireless communication is not possible (step S608a).

When it is determined that communication with first AP 200 is not interrupted while it does not travel between the blocks (No in step S608a), travelling carriage 101 (for example, control unit 151) returns the process to step S601.

On the other hand, when it is determined that communication with first AP 200 is interrupted while travelling carriage 101 does not travel between the blocks without communication information 60 being obtained (Yes in step S608a), setting unit 131 changes IF 170 to a communication slot indicated in association information 70 such that IF 170 can communicate with second AP 300 located in block S1 based on association information 70 stored in storage unit 161 in advance (step S609).

Next, control unit 151 communicates with controller 400 via IF 170 and second AP 300 by using the communication slot changed by setting unit 131 (step S607).

As described above, travel system 2 according to Preferred Embodiment 2 includes travelling carriage 101 that travels on a predetermined track 5; a plurality of APs that include a plurality of first APs 200 and so on that wirelessly communicate with travelling carriage 101 and a plurality of second APs 300 and so on that wirelessly communicate with travelling carriage 101 in a communication slot different from that of first AP 200 and so on; and controller 400 that receives position information 50 indicating the current position of travelling carriage 101 from travelling carriage 101 via any one of a plurality of APs, and transmits a travel instruction to control travel of travelling carriage 101 to travelling carriage 101. Travelling carriage 101 also includes IF 170 that wirelessly communicates with first AP 200 and so on and wirelessly communicates with second AP 300 and so on when it is unable to wirelessly communicate with first AP 200 and so on. In contrast to travelling carriage 100 according to Preferred Embodiment 1, travelling carriage 101 according to Preferred Embodiment 2 includes one wireless interface. Travelling carriage 101 may wirelessly communicate with second AP 300 and so on via IF 170 and may wirelessly communicate with first AP 200 and so on via IF 170 when it is unable to wirelessly communicate with second AP 300 and so on.

The control method of travel system 2 according to Preferred Embodiment 2 includes a communication step of causing a plurality of APs to wirelessly communicate with travelling carriage 101, the plurality of APs including a plurality of first APs 200 and so on that wirelessly communicate with travelling carriage 101 and a plurality of second APs 300 and so on that wirelessly communicate with travelling carriage 101 in a communication slot different from that of first AP 200 and so on; a controlling step of receiving position information 50 indicating the current position of travelling carriage 101 from travelling carriage 101 via any one of the plurality of APs and transmitting by controller 400 a travel instruction to control travel of travelling carriage 101 to travelling carriage 101; and a travelling step of causing travelling carriage 101 to travel on a predetermined track 5 based on the travel instruction. For example, in the communication step, travelling carriage 101 wirelessly communicate with first AP 200 and so on via IF 170 and wirelessly communicates with second AP 300 and so on via IF 170 when it is unable to wirelessly communicate with first AP 200 and so on.

Accordingly, travelling carriage 101 can autonomously select and wirelessly communicate with any one of two access points in a common communication area, for example. As a result, for example, even when one access point has failed, travelling carriage 101 can wirelessly communicate with the other access point, so that travelling carriage 101 can communicate with controller 400. According to travel system 2, therefore, certainty of communication is improved more than before.

For example, when it is not possible to perform wireless communication via IF 170, travelling carriage 101 further includes setting unit 131 that sets a communication slot that is different from the currently set communication slot to IF 170.

For example, the control method of travel system 2 according to Preferred Embodiment 2 further includes a setting step of setting a communication slot different from the currently set communication slot to IF 170 when travelling carriage 101 is incapable of wireless communication via IF 170.

Accordingly, travelling carriage 101 can avoid interruption of communication with controller 400 even when it is provided with one wireless interface, for example. As a result, the certainty of communication for travel system 2 is further improved.

For example, travelling carriage 101 further includes obtaining unit 141 that transmits position information 50 indicating the current position of travelling carriage 101 to controller 400 via IF 170 and obtains communication information 60 indicating a communication slot for communication with second AP 300 and so on at its own current position from controller 400. In this case, for example, setting unit 131 changes the communication slot currently set to IF 170 to a communication slot indicated in communication information 60 obtained by obtaining unit 141 when it is unable to wirelessly communicate with first AP 200 and so on via IF 170.

For example, the control method of travel system 2 according to Preferred Embodiment 2 further includes an obtaining step of travelling carriage 101 transmitting position information 50 indicating the current position of travelling carriage 101 via IF 170 to controller 400 and obtaining communication information 60 indicating a communication slot for communication with second AP 300 and so on at its own current position from controller 400. In this case, for example, in the setting step, when it is not possible to perform wireless communication via IF 170, the communication slot currently set to IF 170 is changed to a communication slot indicated in communication information 60 obtained in the obtaining step.

Accordingly, setting unit 130 can set a suitable communication slot for a communication slot to be used by IF 170 based on the position of travelling carriage 101. As a result, the certainty of communication for travel system 2 is further improved.

For example, travelling carriage 101 further includes storage unit 161 that has stored therein association information 70 indicating association between the current position of travelling carriage 101 and a communication slot in which travelling carriage 101 can communicate with any one of a plurality of APs at the current position. In this case, for example, when communication information 60 cannot be obtained from controller 400 before IF 170 becomes unable to wirelessly communicate with first AP 200 and so on, obtaining unit 141 obtains a communication slot in which travelling carriage 101 can communicate with second AP 300 and so on at the current position of travelling carriage 101 based on association information 70.

For example, the obtaining step of control method of travel system 2 according to Preferred Embodiment 2 further includes a storing step of travelling carriage 101 storing association information 70 indicating association between the current position of travelling carriage 101 and a communication slot in which travelling carriage 101 can communicate with any one of a plurality of APs at the current position. In this case, in the obtaining step, when communication information 60 cannot be obtained from controller 400 before IF 170 becomes unable to wirelessly communicate with first AP 200 and so on, a communication slot in which travelling carriage 101 can communicate with second AP 300 and so on at the current position of travelling carriage 101 is obtained based on association information 70.

Accordingly, travelling carriage 101 can continue to communicate with controller 400 based on association information 70. As a result, the certainty of communication for travel system 2 is further improved.

OTHER PREFERRED EMBODIMENTS

The travel systems and methods according to the present invention have been described above based on the above preferred embodiments. However, the present invention is not limited to the preferred embodiments described above.

For example, in the above preferred embodiments, description has been made on the premise that the communication band used by first IF 110 in wireless communication is a 5 GHz band and the communication band used by second IF 120 in wireless communication is a 2.4 GHz band. This is not a limitation provided that communication bands used by first IF 110 and second IF 120 in wireless communication are different from each other.

For example, in the above preferred embodiments, description has been made on the premise that association information 70 is stored in storage unit in advance before the travelling carriage starts to travel, that is, the storing step has been performed before travelling carriage starts to travel. What timing association information 70 is to be stored in storage unit, that is, the storing step is to be performed, may be matter of choice provided that it is before communication of travelling carriage with first AP is interrupted, for example. For example, the storing step may be performed before the travelling carriage starts to travel or, for example, obtaining unit may store, in storage unit, association information 70 transmitted from controller 400 immediately after the travelling carriage starts to travel.

Furthermore, for example, in the above preferred embodiments, all or some of the components of the processing units such as the control units of the travelling carriage and the controller may be configured using dedicated hardware or may be implemented by executing software programs suited to the respective components. The respective components may be implemented by a program executing unit such as a CPU or a processor reading out and executing a software program recorded on a recording medium such as a hard disk drive (HDD) or a semiconductor memory.

Furthermore, for example, the components of the processing units such as the control units of the travelling carriage and controller may be implemented as a one or more electronic circuits. The one or more electronic circuits may each be a general-purpose circuit or a dedicated circuit.

The one or more electronic circuits may include a semiconductor device, an integrated circuit (IC), or a large scale integration (LSI), etc. The IC or LSI may be integrated as a single chip or as a plurality of chips. Here, the electronic circuit is called an IC or an LSI but may be referred to differently depending on the scale of integration, and may be called a system LSI, very large scale integration (VLSI), or ultra large scale integration (ULSI). Furthermore, a field programmable gate array (FPGA) that can be programmed after the LSI is manufactured can be used for the same purpose.

Furthermore, a general or specific aspect of a preferred embodiment of the present invention may be realized as a system, an apparatus, a method, an integrated circuit, or a computer program. Alternatively, a general or specific aspect of a preferred embodiment of the present invention may be realized as a non-transitory computer-readable recording medium such as an optical disc, an HDD, or a semiconductor memory in which the computer program is stored. Furthermore, a general or specific aspect of a preferred embodiment of the present invention may be realized by any combination of a system, an apparatus, a method, an integrated circuit, a computer program, and a recording medium.

Other forms obtained through various modifications to the above preferred embodiments conceived by a person of ordinary skill in the art or forms realized through an arbitrary combination of components in the different preferred embodiments, so long as they do not depart from the essence of the present invention, are included in the present invention.

Preferred embodiments of the present invention are able to be used in travel systems in which wireless communication is performed using a plurality of access points. Specifically, preferred embodiments of the present invention can be used in travel systems including a travelling carriage which, while travelling in an area covered by the access points, dynamically establishes a communication link with any of the access points.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A travel system, comprising:
a travelling carriage to travel on a predetermined track;
a plurality of access points including a plurality of first access points to wirelessly communicate with the travelling carriage and a plurality of second access points to wirelessly communicate with the travelling carriage in a communication slot different from a communication slot of the plurality of first access points; and
a controller to receive position information from the travelling carriage and transmit a travel instruction to the travelling carriage, via any one of the plurality of access points, the position information indicating a current position of the travelling carriage, and the travel instruction being an instruction to control travel of the travelling carriage; wherein
each of the plurality of first access points is disposed so that a portion of a communication area of the first access point overlaps a communication area of an adjacent first access point;
each of the plurality of second access points is disposed so that a portion of a communication area of the second access point overlaps a communication area of an adjacent second access point;
each of the plurality of first access points is disposed so that at least a portion of the communication area of the first access point overlaps a communication area of any one of the plurality of second access points;
the travelling carriage includes a wireless interface to wirelessly communicate with a first access point among the plurality of first access points, and wirelessly communicate with a second access point among the plurality of second access points when wireless communication with the first access point is not possible; and each of the communication slots of the plurality of first access points and the plurality of second access points is a predetermined communication slot of a communication channel.

2. The travel system according to claim 1, wherein the travelling carriage further includes a setting processor to set, to the wireless interface, a communication slot different from a communication slot that is currently set, when wireless communication via the wireless interface is not possible.

3. The travel system according to claim 2, wherein
the travelling carriage further includes an obtaining processor to transmit the position information to the controller and obtain communication information from the controller, via the wireless interface, the position information indicating the current position of the travelling carriage, and the communication information indicating a communication slot to communicate with the second access point in the current position; and
the setting processor changes the communication slot currently set to the wireless interface to the communication slot indicated in the communication information obtained by the obtaining processor, when wireless communication with the first access point via the wireless interface is not possible.

4. The travel system according to claim 3, wherein
the travelling carriage further includes a storage to store association information that indicates an association between the current position of the travelling carriage and a communication slot in which communication with any one of the plurality of access points is possible; and
the obtaining processor is configured or programmed to obtain a communication slot in which communication with the second access point is possible in the current position of the travelling carriage based on the association information, when the communication information could not be obtained from the controller before the wireless interface becomes unable to wirelessly communicate with the first access point.

5. The travel system according to claim 1, wherein the wireless interface includes a first wireless interface to wirelessly communicate with the first access point, and a second wireless interface to wirelessly communicate with the second access point.

6. The travel system according to claim 5, wherein the travelling carriage further includes a setting processor to set, to at least one of the first wireless interface or the second wireless interface, a communication slot different from a communication slot that is currently set, when wireless communication is not possible via at least one of the first wireless interface or the second wireless interface.

7. The travel system according to claim 6, wherein
the travelling carriage further includes an obtaining processor to transmit the position information to the controller and obtain communication information from the controller, via at least one of the first wireless interface or the second wireless interface, the position information indicating the current position of the travelling carriage, and the communication information indicating a communication slot for communicating with any one of the plurality of access points in the current position; and
the setting processor is configured or programmed to change the communication slot currently set to the first wireless interface to the communication slot indicated in the communication information obtained by the obtaining processor, when wireless communication via at least the first wireless interface is not possible.

8. The travel system according to claim 7, wherein the obtaining processor is configured or programmed to transmit the position information to the controller and obtain the communication information from the controller, via the second wireless interface, when wireless communication via the first wireless interface is not possible.

9. The travel system according to claim 7, wherein
the obtaining processor is configured or programmed to transmit the position information to the controller and obtain the communication information from the controller, via at least one of the first wireless interface or the second wireless interface, before the first wireless interface and the second wireless interface become unable to wirelessly communicate; and
the setting processor is configured or programmed to change the communication slot currently set to the first wireless interface to the communication slot indicated in the communication information, after the first wireless interface and the second wireless interface become unable to wirelessly communicate.

10. The travel system according to claim 9, wherein
the travelling carriage further includes a storage to store association information indicating association between the current position of the travelling carriage and a communication slot in which communication with any one of the plurality of access points is possible; and
the obtaining processor is configured or programmed to obtain a communication slot in which communication with any one of the plurality of access points is possible in the current position of the travelling carriage based on the association information, when communication information could not be obtained from the controller before the first wireless interface and the second wireless interface become unable to wirelessly communicate.

11. The travel system according to claim 9, wherein
the obtaining processor is configured or programmed to obtain, from the controller, a communication slot which is set to the first access point and in which communication is possible in the current position and a communication slot which is set to the second access point and in which communication is possible in the current position, as the communication information; and
the setting processor is configured or programmed to change the communication slot set to each of the first wireless interface and the second interface, based on the communication information obtained by the obtaining processor.

12. The travel system according to claim 6, wherein the setting processor is configured or programmed to change the communication slot set to the first wireless interface to the communication slot set to the second wireless interface, when wireless communication via the first wireless interface is not possible.

13. The travel system according to claim 6, wherein the setting processor is configured or programmed to perform setting to enable the second interface to communicate in the communication slot currently set in the second wireless interface and the communication slot currently set in the first wireless interface, when wireless communication via the first wireless interface is not possible.

14. The travel system according to claim 6, wherein the setting processor is configured or programmed to change the communication slot currently set in the second wireless interface to the communication slot currently set in the first wireless interface, when wireless communication between the first wireless interface and the first access point is not possible and wireless communication between the second wireless interface and the second access point is not possible.

15. The travel system according to claim 1, wherein
each of the plurality of first access points is disposed so that at least a portion of the communication area of the first access point overlaps the communication area of any one of the plurality of second access points, and another portion of the communication area of the first access point does not overlap the communication area of any one of the plurality of second access points; and
each of the plurality of second access points is disposed so that at least a portion of the communication area of the second access point overlaps the communication area of any one of the plurality of first access points, and another portion of the communication area of the second access point does not overlap the communication area of any one of the plurality of first access points.

16. A control method of a travel system in which each of a plurality of first access points is disposed so that a portion of a communication area of the first access point overlaps a communication area of an adjacent first access point, each of a plurality of second access points is disposed so that a portion of a communication area of the second access point overlaps a communication area of an adjacent second access point, each of the plurality of first access points is disposed so that at least a portion of the communication area of the first access point overlaps a communication area of any one of the plurality of second access points, the travel system including a travelling carriage including a wireless interface to wirelessly communicate with at least one of a first access point or a second access point, the control method of a travel system comprising:
(a) causing a plurality of access points to wirelessly communicate with the travelling carriage, the plurality of access points including the plurality of first access points to wirelessly communicate with the travelling carriage and a plurality of second access points to wirelessly communicate with the travelling carriage in a communication slot different from a communication slot of the plurality of first access points;
(b) receiving position information from the travelling carriage and transmitting a travel instruction to the travelling carriage, via any one of the plurality of access points, by a controller, the position information indicating a current position of the travelling carriage, and the travel instruction being an instruction to control travel of the travelling carriage; and
(c) causing the travelling carriage to travel on a predetermined track; wherein
the step (c) includes, by the travelling carriage, wirelessly communicating with the first access point via the wireless interface, and wirelessly communicating with the second access point via the wireless interface when wireless communication with the first access point is not possible; and
each of the communication slots of the plurality of first access points and the plurality of second access points is a predetermined communication slot of a communication channel.

17. The control method of a travel system according to claim 16, further comprising:
(d) setting, to the wireless interface, a communication slot different from a communication slot that is currently set, when the travelling carriage cannot wirelessly communicate via the wireless interface.

18. The control method of a travel system according to claim 17, further comprising:
(e) transmitting the position information to the controller and obtaining communication information from the controller, via the wireless interface, by the travelling carriage, the position information indicating the current position of the travelling carriage, and the communication information indicating a communication slot to communicate with the second access point in the current position; wherein
the step (d) includes changing the communication slot currently set to the wireless interface to the communication slot indicated in the communication information obtained in the step (e), when wireless communication via the wireless interface is not possible.

19. The control method of a travel system according to claim 18, further comprising:
(f) storing association information by the travelling carriage, the association information indicating association between the current position of the travelling carriage and a communication slot in which communication with any one of the plurality of access points is possible; wherein
the step (e) includes obtaining a communication slot in which communication with the second access point is possible in the current position of the travelling carriage based on the association information, when the communication information could not be obtained from the controller before the wireless interface becomes unable to wirelessly communicate with the first access point.

20. The control method of a travel system according to claim 16, wherein the wireless interface includes a first wireless interface that wirelessly communicates with the first access point, and a second wireless interface that wirelessly communicates with the second access point.

21. The control method of a travel system according to claim 20, further comprising:
(d) setting, by the travelling carriage, to at least one of the first wireless interface or the second wireless interface, a communication slot different from a communication slot that is currently set, when wireless communication is not possible via at least one of the first wireless interface or the second wireless interface.

22. The control method of a travel system according to claim 21, further comprising:
(e) transmitting the position information to the controller and obtaining communication information from the controller, via at least one of the first wireless interface or the second wireless interface, by the travelling carriage, the position information indicating the current position of the travelling carriage, and the communication information indicating a communication slot to communicate with any one of the plurality of access points in the current position; wherein
the step (d) includes changing the communication slot currently set to the first wireless interface to the communication slot indicated in the communication information obtained in the step (e), when wireless communication via at least the first wireless interface is not possible.

23. The control method of a travel system according to claim 22, wherein the step (d) includes transmitting the position information to the controller and obtaining the communication information from the controller, via the second wireless interface, when wireless communication via the first wireless interface is not possible.

24. The control method of a travel system according to claim 22, wherein
the step (e) includes transmitting the position information to the controller and obtaining the communication information from the controller, via at least one of the first wireless interface or the second wireless interface, before the first wireless interface and the second wireless interface become unable to wirelessly communicate; and
the step (d) includes changing the communication slot currently set to the first wireless interface to the communication slot indicated in the communication information, after the first wireless interface and the second wireless interface become unable to wirelessly communicate.

25. The control method of a travel system according to claim 22, further comprising:
(f) storing association information by the travelling carriage, the association information indicating association between the current position of the travelling carriage and a communication slot in which communication with any one of the plurality of access points is possible; and
the step (e) includes obtaining a communication slot in which communication with any one of the plurality of access points is possible in the current position of the travelling carriage based on the association information, when communication information could not be obtained from the controller before the first wireless interface and the second wireless interface become unable to wirelessly communicate.

26. The control method of a travel system according to claim 22, wherein
the step (e) includes obtaining, from the controller, a communication slot which is set to the first access point and in which communication is possible in the current position and a communication slot which is set to the second access point and in which communication is possible in the current position, as the communication information; and
the step (d) includes changing the communication slot set to each of the first wireless interface and the second interface, based on the communication information obtained by the obtaining processor.

27. The control method of a travel system according to claim 21, wherein the step (d) includes changing the communication slot set to the first wireless interface to the communication slot set to the second wireless interface, when wireless communication via the first wireless interface is not possible.

28. The control method of a travel system according to claim 21, wherein the step (d) includes performing setting to enable the second interface to communicate in the communication slot currently set in the second wireless interface and the communication slot currently set in the first wireless interface, when wireless communication via the first wireless interface is not possible.

29. The control method of a travel system according to claim 21, wherein the step (d) includes changing the communication slot currently set in the second wireless interface to the communication slot currently set in the first wireless interface, when wireless communication between the first wireless interface and the first access point is not possible and wireless communication between the second wireless interface and the second access point is not possible.

* * * * *